(12) United States Patent
Heo

(10) Patent No.: US 11,070,831 B2
(45) Date of Patent: Jul. 20, 2021

(54) METHOD AND DEVICE FOR PROCESSING VIDEO SIGNAL

(71) Applicant: LG ELECTRONICS INC., Seoul (KR)

(72) Inventor: Jin Heo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/765,027

(22) PCT Filed: Nov. 30, 2018

(86) PCT No.: PCT/KR2018/015032
§ 371 (c)(1),
(2) Date: May 18, 2020

(87) PCT Pub. No.: WO2019/107998
PCT Pub. Date: Jun. 6, 2019

(65) Prior Publication Data
US 2020/0404302 A1 Dec. 24, 2020

Related U.S. Application Data

(60) Provisional application No. 62/593,203, filed on Nov. 30, 2017.

(51) Int. Cl.
*H04N 19/44* (2014.01)
*H04N 19/105* (2014.01)
(Continued)

(52) U.S. Cl.
CPC ......... *H04N 19/44* (2014.11); *H04N 19/105* (2014.11); *H04N 19/132* (2014.11);
(Continued)

(58) Field of Classification Search
None
See application file for complete search history.

(56) References Cited

U.S. PATENT DOCUMENTS

2013/0101036 A1    4/2013   Zhou
2013/0107942 A1*   5/2013   Chen ............... H04N 19/66
                                              375/240.03
(Continued)

FOREIGN PATENT DOCUMENTS

KR   20170102385 A    9/2017
WO   2017018664 A1    2/2017
WO   2017065532 A1    4/2017

OTHER PUBLICATIONS

Chen, et. al., Algorithm Description of Joint Exploration Test Model 7 (JEM 7), Joint Video Exploration Team (JVET) of ITU-T SG 16 WP 3 and ISO/IEC JTC 1/SC 29/WG 11, JVET-G1001, 7th Meeting, Torino, IT, Jul. 21, 2017 (48 Pages).

*Primary Examiner* — Talha M Nawaz
(74) *Attorney, Agent, or Firm* — Dentons US LLP

(57) ABSTRACT

The present invention relates to a method for decoding a bitstream for a video signal, and a device therefor, and relates to a device and a method in which, according to whether or not intra linear interpolation prediction is performed for the current block, a candidate mode list is formed on the basis of the intra prediction mode of the neighboring block of the current block, a candidate mode is determined, and, on the basis of same, intra LIP is carried out, thereby generating a prediction value for the current block.

10 Claims, 21 Drawing Sheets

(51) Int. Cl.
*H04N 19/132* (2014.01)
*H04N 19/159* (2014.01)
*H04N 19/176* (2014.01)
*H04N 19/46* (2014.01)

(52) U.S. Cl.
CPC ......... *H04N 19/159* (2014.11); *H04N 19/176* (2014.11); *H04N 19/46* (2014.11)

(56) References Cited

U.S. PATENT DOCUMENTS

| | | | |
|---|---|---|---|
| 2015/0213809 A1* | 7/2015 | Peters | G10L 19/20 704/500 |
| 2017/0150186 A1* | 5/2017 | Zhang | H04N 19/625 |
| 2018/0234679 A1* | 8/2018 | Heo | H04N 19/176 |
| 2018/0249156 A1* | 8/2018 | Heo | H04N 19/70 |
| 2018/0324418 A1* | 11/2018 | Koo | H04N 19/593 |
| 2019/0306532 A1* | 10/2019 | Ikonin | H04N 19/82 |

* cited by examiner (a)

(b)

(a) Reference samples of the same size as the current block (b) Reference samples of a greater size than the current block (a)

(b)

Rough Mode Decision (RMD)

1. RMD for even mode → N modes (S1410)

2. RMD for ±1 modes of selected N modes → N modes (S1420)

3. RMD for LIP MPM 6 modes → N modes (S2130)

4. add HEVC MPM candidates → N modes (S1430)

Full RD (S1440)

min : N modes
Max : N+M modes (a)

| Block shape | Application of linear interpolation intra prediction ||
| --- | --- | --- |
| | Horizontal directivity mode | Vertical directivity mode |
| Short width, long length | X | O |
| Long width, short length | O | X |

_US 11,070,831 B2_

METHOD AND DEVICE FOR PROCESSING VIDEO SIGNAL

This application is the National Phase of PCT International Application No. PCT/KR2018/015032, filed on Nov. 30, 2018, which claims priority under 35 U.S.C. 119(e) to U.S. Provisional Application No. 62/593,203, filed on Nov. 30, 2017, which is hereby incorporated by reference herein in their entirety.

TECHNICAL FIELD

The present invention relates to a video processing method, and more specifically, relates to a method and apparatus for processing a video signal using an intra prediction.

BACKGROUND ART

In accordance with the rapid development of a digital video processing technology, a digital multimedia service using various media such as high-definition digital broadcasting, digital multimedia broadcasting, internet broadcasting and the like has been activated. As the high-definition digital broadcasting becomes common, various service applications have been developed and high-speed video processing techniques for video images of high quality and high definition are required. To this end, standards for coding video signals such as H.265/HEVC (High Efficiency Video Coding) and H.264/AVC (Advanced Video Coding) have been actively discussed.

DETAILED DESCRIPTION OF DISCLOSURE

Technical Tasks

One technical task of the present disclosure is to provide a method of processing a video signal efficiently and apparatus therefor.

Another technical task of the present disclosure is to provide a method of encoding/decoding a complicated image more efficiently in a manner of providing various coding structures applicable to linear interpolation intra prediction encoding upon performing intra encoding on a still or moving image and apparatus therefor.

Further technical task of the present disclosure is to provide a method of preventing encoding performance and coding efficiency from being degraded while improving intra prediction performance based on an intra linear interpolation prediction mode and apparatus therefor.

Technical tasks obtainable from the present disclosure are non-limited by the above-mentioned technical task. And, other unmentioned technical tasks can be clearly understood from the following description by those having ordinary skill in the technical field to which the present disclosure pertains.

Technical Solutions

In a first aspect of the present disclosure, provided herein is a method of decoding a bitstream for a video signal by a decoding apparatus, the method comprising: obtaining a first flag information from the bitstream, the first flag information indicating whether an intra linear interpolation prediction is performed for a current block; when the intra linear interpolation prediction is performed for the current block according to the first flag information, skipping parsing of a second flag information indicating whether an intra prediction mode of the current block is derived from a neighboring block of the current block and obtaining a first index information from the bitstream; constructing a candidate mode list based on an intra prediction mode of the neighboring block of the current block; determining a candidate mode indicated by the first index information in the candidate mode list as the intra prediction mode of the current block; and generating a predictor for the current block by performing an intra LIP based on the determined intra prediction mode.

In a second aspect of the present disclosure, provided herein is an apparatus for decoding a bitstream for a video signal, the apparatus comprising: a memory; and a processor connected to the memory upon operation, wherein the processor is configured to: obtain a first flag information from the bitstream, the first flag information indicating whether an intra linear interpolation prediction is performed for a current block; when the intra linear interpolation prediction is performed for the current block according to the first flag information, skip parsing of a second flag information indicating whether an intra prediction mode of the current block is derived from a neighboring block of the current block and obtain a first index information from the bitstream; construct a candidate mode list based on an intra prediction mode of the neighboring block of the current block; determine a candidate mode indicated by the first index information in the candidate mode list as the intra prediction mode of the current block; and generate a predictor for the current block by performing an intra LIP based on the determined intra prediction mode.

Preferably, performing the LIP may comprise: generating a bottom right reference sample for the current block; generating bottom reference samples for the current block, wherein the bottom reference samples include a reference sample generated by performing a first linear interpolation based on a bottom left reference sample adjacent to a bottom left of the current block and the bottom right reference sample, the bottom left reference sample, and reference samples generated by copying left reference samples adjacent to a left of the current block onto same vertical coordinates as the bottom reference samples respectively; and generating a prediction sample by performing a second linear interpolation based on the determined intra prediction mode, the bottom reference samples, and top reference samples adjacent to a top of the current block.

Preferably, the bottom right reference sample may be generated based on a top right reference sample adjacent to a top right of the current block and the bottom left reference sample.

Preferably, the bottom right reference sample may be generated based on a bottom right corner reference sample within a top right neighboring block adjacent to a top right of the current block and having a same size as the current block and a bottom right corner reference sample within a bottom left neighboring block adjacent to a bottom left of the current block and having the same size as the current block.

Preferably, a weight for the second linear interpolation may be determined based on a difference of a vertical coordinate between a sample of the current block and the top reference samples and a difference of a vertical coordinate between the sample of the current block and the bottom reference samples.

Preferably, the method may further comprise: when the intra linear interpolation prediction is not performed for the current block according to the first flag information, obtaining the second flag information from the bitstream; when the intra prediction mode of the current block is derived from the neighboring block according to the second flag information, obtaining a second index information from the bitstream and determining a candidate mode indicated by the second index information among the candidate mode list as the intra prediction mode of the current block; and when the intra prediction mode of the current block is not derived from the neighboring block according to the second flag information, obtaining an intra prediction mode information from the bitstream and obtaining the intra prediction mode of the current block based on the intra prediction mode information.

Preferably, the candidate mode list may be constructed to include 3 candidate modes including at least one of an intra prediction mode of a left neighboring block adjacent to the current block or an intra prediction mode of a top neighboring block adjacent to the current block.

Preferably, the candidate mode list may be constructed to include 6 candidate modes including at least one of an intra prediction mode of a left neighboring block adjacent to the current block, an intra prediction mode of a bottom left neighboring block adjacent to the current block, an intra prediction mode of a top neighboring block adjacent to the current block, an intra prediction mode of a top left neighboring block adjacent to the current block, or an intra prediction mode of a top right neighboring block adjacent to the current block.

Preferably, the candidate mode list may include an intra angular prediction mode other than an intra planar prediction mode and an intra DC prediction mode.

Advantageous Effects

According to the present disclosure, a video signal can be efficiently processed.

According to the present disclosure, a complicated image can be encoded/decoded more efficiently in a manner of providing various coding structures applicable to linear interpolation intra prediction encoding upon performing intra encoding on a still or moving image.

In addition, according to the present disclosure, encoding performance and coding efficiency can be prevented from being degraded while improving intra prediction performance based on an intra linear interpolation prediction mode r.

Effects obtainable from the present disclosure are non-limited by the above-mentioned effects. And, other unmentioned effects can be clearly understood from the following description by those having ordinary skill in the technical field to which the present disclosure pertains.

DESCRIPTION OF DRAWINGS

The accompanying drawings, which are included to provide a further understanding of the invention, illustrate embodiments of the invention and together with the description serve to explain the principle of the invention.

FIGS. 25 and 26 illustrate a non-square block to which the present disclosure is applicable.

BEST MODE FOR DISCLOSURE

Figure 1:
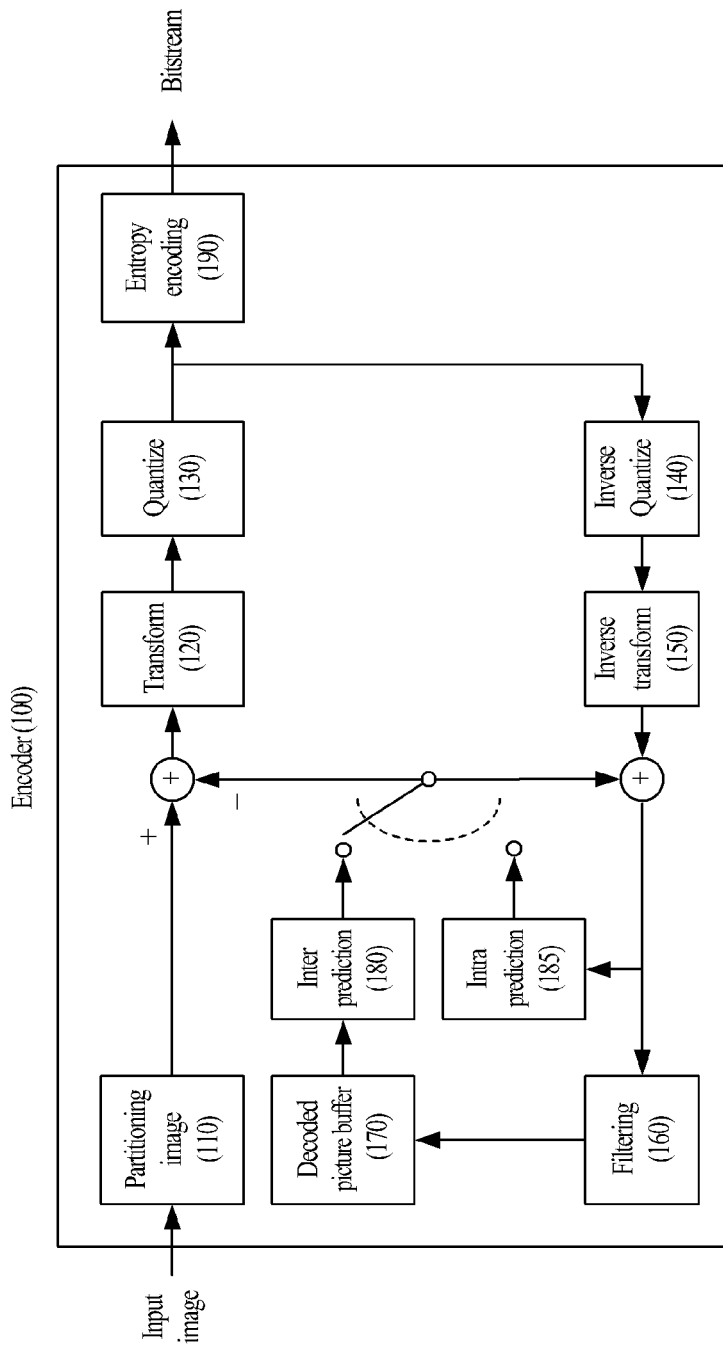
FIG. 1 illustrates an encoder for encoding a video signal.

A technology described in the following can be used for an image signal processing apparatus configured to encode and/or decode a video signal. Generally, a video signal corresponds to an image signal or a sequence of pictures capable of being recognized by eyes. Yet, in the present specification, the video signal can be used to refer to a sequence of bits representing a coded picture or a bit stream corresponding to a bit sequence. A picture may indicate an array of samples and can be referred to as a frame, an image, or the like. More specifically, the picture may indicate a two-dimensional array of samples or a two-dimensional sample array. A sample may indicate a minimum unit for constructing a picture and may be referred to as a pixel, a picture element, a pel, or the like. The sample may include a luminance (luma) component and/or a chrominance (chroma, color difference) component. In the present specification, coding may be used to indicate encoding or may commonly indicate encoding/decoding.

A picture may include at least one or more slices and a slice may include at least one or more blocks. The slice can be configured to include the integer number of blocks for purposes such as parallel processing, resynchronization of decoding when a bit stream is damaged due to data loss, and the like. Each slice can be independently coded. A block may include at least one or more samples and may indicate an array of samples. A block may have a size equal to or a less than a size of a picture. A block may be referred to as a unit. A currently coded (encoded or decoded) picture may be referred to as a current picture and a block currently being coded (encoded or decoded) may be referred to as a current block. There may exist various block units constructing a picture. For example, in case of ITU-T (International Telecommunication Union Telecommunication Standardization Sector) H.265 standard (or High Efficiency Video Coding (HEVC) standard), there may exist such a block unit as a coding tree block (CTB) (or a coding tree unit (CTU)), a coding block (CB) (or a coding unit (CU)), a prediction block (PB) (or a prediction unit (PU)), a transform block (TB) (or a transform unit (TU)), and the like.

The coding tree block corresponds to the most basic unit for constructing a picture and can be divided into coding blocks of a quad-tree form to improve coding efficiency according to texture of a picture. The coding block may correspond to a basic unit for performing coding and intra-coding or inter-coding can be performed in a unit of the coding block. The intra-coding is to perform coding using intra prediction and the intra prediction is to perform prediction using samples included in the same picture or slice. The inter-coding is to perform coding using inter prediction and the inter prediction is to perform prediction using samples included in a picture different from a current picture. A block coded using the intra-coding or coded in an intra prediction mode may be referred to as an intra block, and a block coded using the inter-coding or coded in an inter prediction mode may be referred to as an inter block. And, a coding mode using intra prediction can be referred to as an intra mode, and a coding mode using inter prediction can be referred to as an inter mode.

The prediction block may correspond to a basic unit for performing prediction. Identical prediction can be applied to a prediction block. For example, in case of the inter prediction, the same motion vector can be applied to one prediction block. The transform block may correspond to a basic unit for performing transformation. The transformation may correspond to an operation of transforming samples of a pixel domain (or a spatial domain or a time domain) into a conversion coefficient of a frequency domain (or a transform coefficient domain), or vice versa. In particular, an operation of converting a conversion coefficient of the frequency domain (or transform coefficient domain) into samples of the pixel domain (or spatial domain or time domain) can be referred to as inverse transformation. For example, the transformation may include discrete cosine transform (DCT), discrete sine transform (DST), a Fourier transform, and the like. A prediction block and/or a transform block may be configured to have the same size as a coding block, and in this case the prediction may be performed and/or the transformation may be performed in the unit of a coding block.

In the present specification, a coding tree block (CTB) may be interchangeably used with a coding tree unit (CTU), a coding block (CB) may be interchangeably used with a coding unit (CU), a prediction block (PB) may be interchangeably used with a prediction unit (PU), and a transform block (TB) may be interchangeably used with a transform unit (TU).

FIG. 1 is a block diagram of an encoder performing encoding of a video signal as an embodiment to which the present disclosure is applied.

Referring to FIG. 1, an encoder 100 may include an image partitioning unit 110, a transformer 120, a quantizer 130, an inverse quantizer 140, an inverse transformer 150, a filtering unit 160, a Decoded Picture Buffer (DPB) 190, an inter prediction unit 180, an intra prediction unit 185, and an entropy encoder 190.

The image partitioning unit 110 may split an input image (or, picture, frame, etc.) inputted to the encoder 100 into one or more processed units. For example, the processed unit may include a Coding Tree Unit (CTU), a Coding Unit (CU), a Prediction Unit (PU), or a Transform Unit (TU).

The encoder 100 may generate a residual signal by subtracting a prediction signal outputted from the inter prediction unit 180 or the intra prediction unit 185 from an input image signal, and the generated residual signal is transmitted to the transformer 120.

The transformer 120 may generate a transform coefficient by performing transform based on the residual signal. For example, a transform scheme may include at least one of Discrete Cosine Transform (DCT), Discrete Sine Transform (DST), Karhunen-Loeve Transform (KLT), Graph-Based Transform (GBT), and Conditionally Non-linear Transform (CNT). Particularly, 4×4 or 32×32 integer-based DCT is available, and 4×4, 8×8, 16×16, and 32×32 transforms are available. When inter-pixel relation information is represented as a graph, GBT means a transform obtained from this graph. CNT means a transform obtained based on a prediction signal generated using all previously reconstructed pixels. In addition, a transform process is applicable to a pixel block having the same size of a square or a block having a non-square variable size.

The quantizer 130 may quantize the transform coefficient and then send it to the entropy encoder 190. And, the entropy encoder 190 may entropy-code and output the quantized signal as a bitstream. For example, the entropy coding may be performed based on Fixed Length Coding (FLC), Variable Length Coding (VLC), or arithmetic coding. Particularly, context adaptive binary arithmetic coding (CABAC) based on arithmetic coding, Exp-Golomb coding based on variable length coding, and fixed length coding are applicable.

The quantized signal outputted from the quantizer 130 is usable to generate a prediction signal. For example, the quantized signal may reconstruct a residual signal by applying inverse quantization and inverse transform through the inverse quantizer 140 and the inverse transformer 150. A reconstructed signal may be generated by adding the reconstructed residual signal to the prediction signal outputted from the inter prediction unit 180 or the intra prediction unit 185.

The filtering unit 160 applies filtering to the reconstructed signal and then outputs it to a playback device or the decoded picture buffer 170. For the filtering, a deblocking filter or a Sample Adaptive Offset (SAO) filter is applicable for example. The filtered signal transmitted to the decoded picture buffer 179 may be used as a reference picture in the inter prediction unit 180. Thus, using a filtered picture as a reference picture in inter prediction mode, coding efficiency can be improved as well as an image quality.

The decoded picture buffer 170 may store the filtered picture to use a reference picture in the inter prediction unit 180.

The inter prediction unit 180 performs temporal prediction and/or spatial prediction to remove temporal redundancy and/or spatial redundancy with reference to a reconstructed picture. In doing so, to reduce a quantity of motion information transmitted in inter prediction mode, it is able to predict motion information based on correlation of the motion information between a neighboring block and the current block.

The intra prediction unit 185 may predict the current block by referring to samples around the current block. The intra prediction unit 185 may perform the following procedure to perform intra prediction. First, a reference sample needed to generate a prediction signal may be prepared. And, a prediction signal may be generated using the prepared reference sample. Then, the prediction mode is encoded. At this time, the reference sample may be prepared through reference sample padding and/or reference sample filtering. A quantization error may exist because the reference sample has undergone a prediction and reconstruction process. Therefore, to reduce such an error, a reference sample filtering process may be performed for each prediction mode used for an intra prediction.

The prediction signal generated by the inter prediction unit 180 or the intra prediction unit 185 may be used to generate a reconstructed signal or a residual signal.

Figure 2:
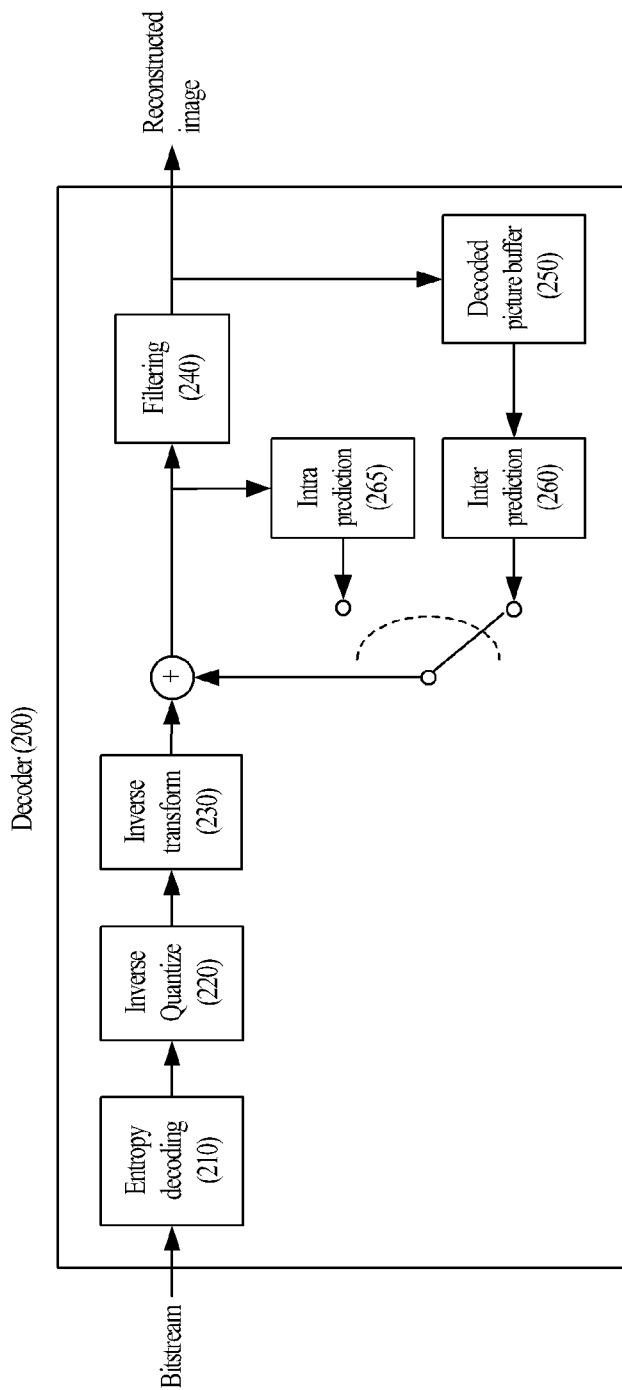
FIG. 2 illustrates a decoder for decoding a video signal.

FIG. 2 is a block diagram of a decoder performing decoding of a video signal as an embodiment to which the present disclosure is applied.

Referring to FIG. 2, a decoder 200 may include an entropy decoder 210, an inverse quantizer 220, an inverse transformer 230, a filtering unit 240, a Decoded Picture Buffer (DPB) unit 250, an inter prediction unit 260 and an intra prediction unit 265.

And, a reconstructed image signal outputted through the decoder 200 may be reproduced through a playback device.

The decoder 200 may receive a signal outputted from the encoder 100 of FIG. 1, and the received signal may be entropy-decoded through the entropy decoder 210.

The inverse quantizer 220 obtains a transform coefficient from the entropy-decoded signal using quantization step size information.

The inverse transformer 230 obtains a residual signal by performing inverse transform based on the inverse quantized transform coefficient.

The obtained residual signal is added to a prediction signal outputted from the inter prediction unit 260 or the intra prediction unit 265, thereby generating a reconstructed signal.

The filtering unit 240 applies filtering to the reconstructed signal and then outputs it to the playback device or transmits it to the decoded picture buffer 250. The filtered signal transmitted to the decoded picture buffer 250 may be used as a reference picture by the inter prediction unit 260.

In the present specification, the embodiments described in the filtering unit 160, the inter prediction unit 180 and the intra prediction unit 185 of the encoder 100 are exactly applicable to the filtering unit 240, the inter prediction unit 260 and the intra prediction unit 265 of the decoder, respectively.

Figure 3:
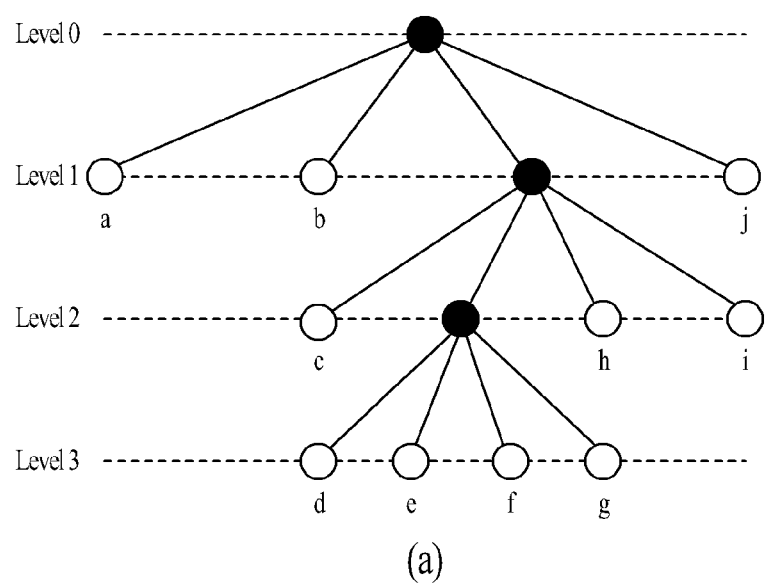
FIG. 3 illustrates a partitioning structure of a coding unit.
Figure 3:
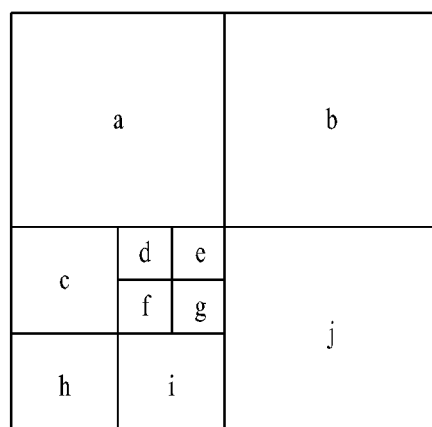

FIG. 3 is a diagram to describe a split structure of a coding unit.

An encoder and decoder may split a single image (or picture) in unit of a Coding Tree Unit (CTU) in a quadrilateral shape and perform encoding and decoding in unit of the CTU.

A single CTU may be split based on a quadtree (hereinafter 'QT') structure. For example, a single CTU can be split into four units with a square shape and a half-decreased length of each side. Such split of the QT structure may be performed recursively.

Referring to FIG. 3, a root node of QT may be related to CTU. The QT may be split until a leaf node is reached, and the leaf node may be referred to as a Coding Unit (CU). The CTU corresponds to the root node and has the smallest depth (i.e. level 0) value. Depending on the characteristics of an input image, the CTU may not be split. In this case, the CTU corresponds to the CU.

In the example of FIG. 3, a CTU may be split in form of QT. As a result, lower nodes having a depth of level 1 may be generated. And, a node that is no longer split (i.e., a leaf node) among the lower nodes having the depth of level 1 corresponds to a CU. For example, in FIG. 3 (*b*), CU a, CU b and CU j respectively corresponding to a node a, node b and node j are split once in CTU and have the depth of level 1.

Regarding a single CU, information indicating whether the corresponding CU is split may be delivered to a decoder. For example, the information may be defined as a split flag and represented as syntax information 'split_cu_flag'. The split flag may be included in every CU except CU in small size. For example, if a value of the split flag is '1', the corresponding CU is split into 4 CUs again. If a value of the split flag is '0', the corresponding CU is no longer split and a coding process for the corresponding CU may be performed.

Although a split process of CU is described for example in FIG. 3, the above-mentioned QT structure is applicable to a split process of a Transform Unit (TU) that is a basic unit for performing transform.

TU may be hierarchically split into a QT structure from CU to be coded. For example, CU may correspond to a root node of a tree for Transform Unit (TU).

As TU is split according to a QT structure, TU split from CU may be split into a smaller lower TU again. For example, a size of TU may be determined as one of 32×32, 16×16, 8×8, and 4×4, by which the present disclosure is non-limited. In case of a high-resolution image, a size of TU may be further increased or diversified.

Regarding a single TU, information indicating whether the corresponding TU is split may be delivered to a decoder. For example, the information may be defined as a split transform flag and represented as syntax information 'split_transform_flag'.

Figure 4:
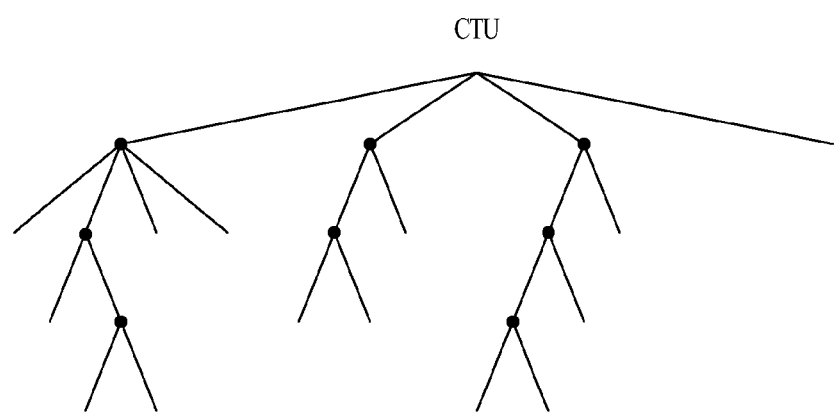
FIG. 4 illustrates a quadtree-binary tree in a partitioning structure of a coding unit.
Figure 4:
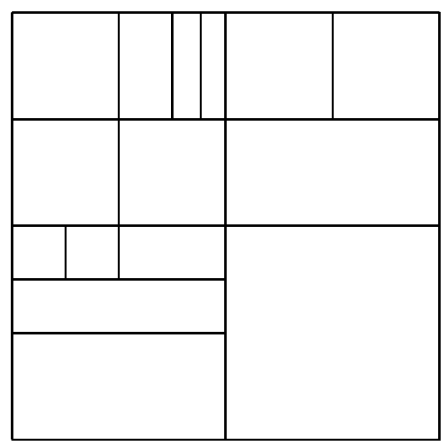

FIG. 4 is a diagram to describe a quadtree-binary tree in a split structure of a coding unit.

An encoder and decoder may split a single image (or picture) in unit of a Coding Tree Unit (CTU) in a quadrilateral shape and perform encoding and decoding in unit of the CTU.

In the example of FIG. 4, compared to the example of FIG. 3, a single CTU may be split based on a quadtree and Binary Tree (BT) structure. For example, a single CTU may be split into four units with a square shape and a half-decreased length of each side or two units with a rectangular shape and a half-decreased width or height. Such split of the QT BT structure may be performed recursively.

Referring to FIG. 4, a root node of QT may be related to CTU. The QT may be split until a QT leaf node is reached. And, the leaf node of the QT may be split until a BT leaf node is reached.

In the example of FIG. 4, CTU corresponds to a root node and have a value of a smallest depth (i.e., level 0). Depending on the characteristics of an input image, the CTU may not be split. In this case, the CTU corresponds to CU.

CTU may be split in form of QT and QT leaf node may be split in form of BT. As a result, lower nodes having a depth of level n may be generated. And, a node that is not further split (i.e., a leaf node) among the lower nodes having the depth of level n corresponds to CU.

Regarding a single CU, information indicating whether the corresponding CU is split may be delivered to a decoder. For example, the information may be defined as a split flag and represented as syntax information 'split_cu_flag'. Moreover, information indicating whether to be split into BT from QT leaf may be delivered to the decoder. For example, the information may be defined as BT split flag and represented as syntax information 'bt_split_flag'. Additionally, in case of being split into BT by bt_split_flag, a BT split shape may be delivered to the decoder so as to be split into a rectangle with a half width or a rectangular shape with a half height. For example, the information may be defined as BT split mode and represented as 'bt_split_mode'.

Figure 5:
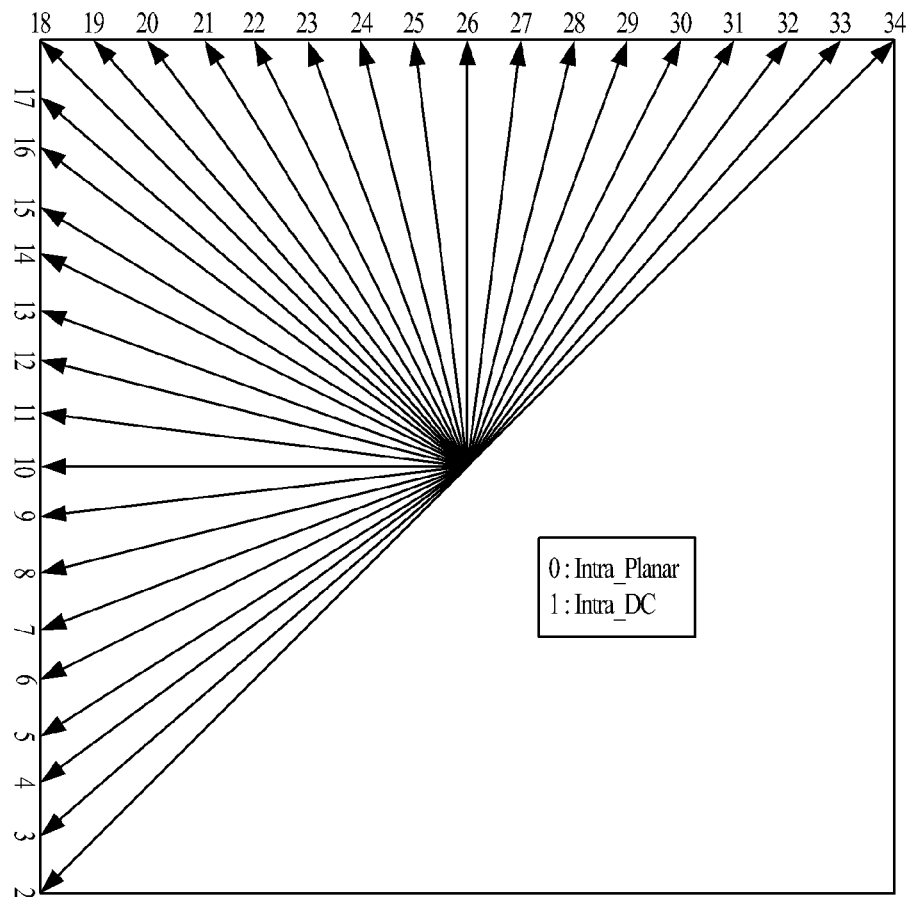
FIG. 5 illustrates an example of an intra prediction mode.

FIG. 5 shows an example of an intra prediction mode.

An intra prediction mode indicates various prediction modes according to values. For example, a value of an intra prediction mode may correspond to an intra prediction mode exemplarily shown in Table 1.

TABLE 1

| Intra prediction mode | Associated name |
| --- | --- |
| 0 | INTRA_PLANAR |
| 1 | INTRA_DC |
| 2 . . . 34 | INTRA_ANGULAR2 . . . INTRA_ANGULAR34 |

In Table 1, INTRA_PLANAR represents an intra planar prediction mode and indicates a mode of obtaining a predictor of the current block by performing interpolation on a reconstructed sample of an upper neighboring block adjacent to the current block, a reconstructed sample of a left neighboring block, a reconstructed sample of a lower-left neighboring block, and a reconstructed sample of a right-upper neighboring block. INTRA_DC represents an intra Direct Current (DC) prediction mode and indicates a mode of obtaining a predictor of the current block using an average of reconstructed samples of a left neighboring block and reconstructed samples of an upper neighboring block. INTRA_ANGULAR2 to INTRA_ANGULAR34 represent an intra angular prediction mode and indicate a mode of finding a predictor of the current sample using a reconstructed sample of a neighboring block located in a direction of a specific angle to the current sample in the current block (e.g., see FIG. 5). If a real sample fails to exist in a direction of a specific angle, a predicted sample may be found by creating a virtual sample for the corresponding direction in a manner of performing interpolation or padding on neighboring reconstructed samples.

Although an intra prediction mode may be derived per coding block, intra prediction may be performed in unit of a coding or transform block. For the intra prediction, a reconstructed sample existing in a neighboring block of the current block may be referred to in the current picture. And, a sample referred to for the intra prediction is referred to as a reference sample. In the intra prediction, prediction of the current block is performed based on a derived prediction mode. A reference sample used for prediction and a specific prediction method may vary depending on a prediction mode.

An encoder and decoder may check whether neighboring samples of the current block are available for prediction and then determine reference samples to use for the prediction. For example, when a size of the current block is nS×nS, neighboring samples of the current block in intra prediction may use nS reference samples adjacent to a left (or a left boundary) of the current block, nS reference samples neighboring a bottom-left of the current block, nS reference samples adjacent to a top (or a top boundary) of the current block, nS reference samples neighboring to a top-right of the current block, and a single sample neighboring a top-left of the current block as reference samples. If some of neighboring samples of the currently processed block are unavailable, the encoder and decoder may determine reference samples with available samples to use for prediction by performing interpolation or padding based on the unavailable samples. Filtering of a reference sample may be performed based on an intra prediction mode.

An encoder and decoder may generate a predictor for the current block based on an intra prediction mode and reference samples. Particularly, the encoder may determine an intra prediction mode using reference samples or a filtered reference sample based on Rate-Distortion (RD) optimization, encode syntax information indicating an intra prediction mode into a bitstream, generate a predictor for the current block based on the determined intra prediction mode, and encode the current block using the generated predictor. The decoder may generate a predictor for the current block based on the intra prediction mode and the reference samples and then reconstruct the current block based on the generated predictor. Namely, the decoder may generate the predictor for the current block based on the intra prediction mode derived from an intra prediction mode inducing step and the reference samples obtained through a reference sample determining step and a reference sample filtering step.

Figure 6:
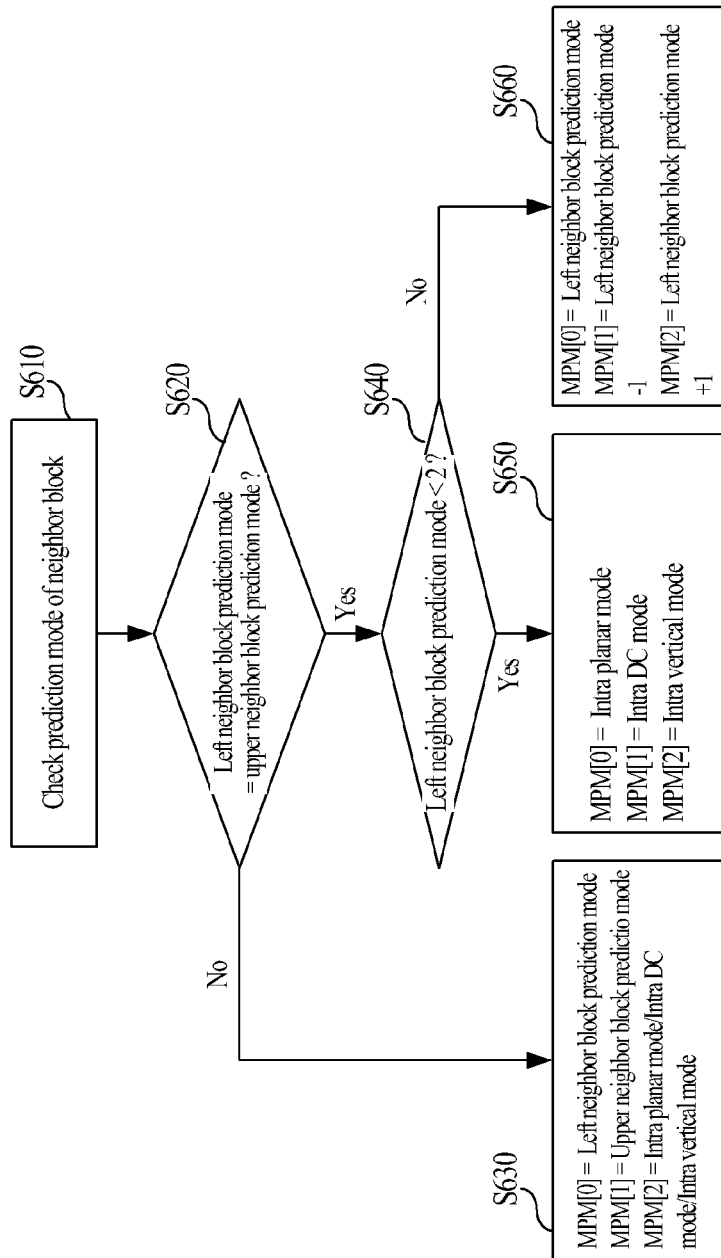
FIG. 6 and FIG. 7 illustrate a signaling method of an intra prediction mode.
Figure 7:
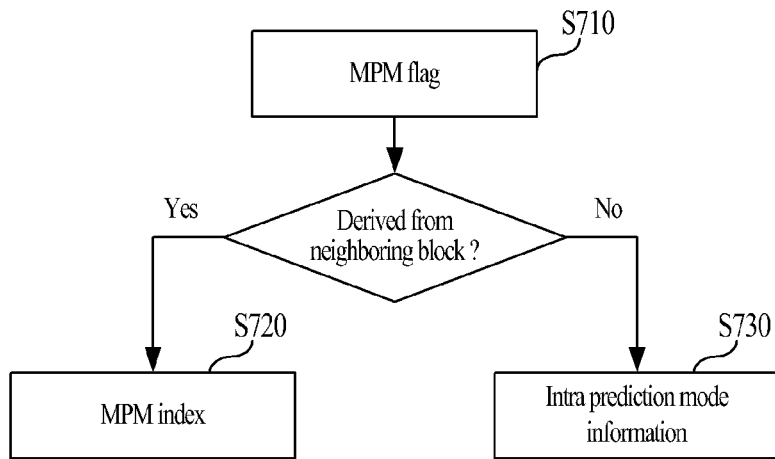

FIG. 6 and FIG. 7 exemplarily show a signaling method of an intra prediction mode.

Generally, if an image is split into blocks, the current block to be coded and a neighboring block may have similar image characteristics. In case of an intra prediction mode, it is highly probable that the current block and a neighboring block have the same or similar intra prediction mode. Hence, an encoder or decoder may use a prediction mode of a neighboring block to encode or derive a prediction mode of the current block.

First of all, in case that a neighboring block is intra-coded, an encoder may check or derive a prediction mode of the neighboring block [S610]. For example, a prediction mode of the current block may be determined based on a prediction mode of a left neighboring block and a prediction mode of an upper neighboring block. In this case, a prediction mode of a corresponding neighboring block may be determined as Most Probable Mode (MPM). The MPM may mean a mode used to improve coding efficiency in consideration of similarity between the current block and a neighboring block upon intra prediction mode coding. Determining MPM may be expressed as listing up MPM candidates (or MPM list}.

The encoder may check whether the prediction mode of the left neighboring block and the prediction mode of the upper neighboring block are identical to each other [S620].

If the prediction mode of the left neighboring block and the prediction mode of the upper neighboring block are not identical to each other, a first MPM may be set to the prediction mode of the left neighboring block, a second MPM may be set to the prediction mode of the upper neighboring block, and a third MPM may be set to one of an intra planar mode, an intra DC mode and an intra vertical mode [S630].

If the prediction mode of the left neighboring block and the prediction mode of the upper neighboring block are identical to each other, the encoder may check whether the prediction mode of the left neighboring block is smaller than 2 [S640].

If the prediction mode of the left neighboring block is smaller than 2, the first MPM may be set to the intra planar mode, the second MPM may be set to the intra DC mode, and the third MPM may be set to the intra vertical mode [S650].

If the prediction mode of the left neighboring block is not smaller than 2, the first MPM may be set to the prediction mode of the left neighboring block, the second MPM may be set to (the prediction mode of the left neighboring block−1), and the third MPM may be set to (the prediction mode of the left neighboring block+1) [S660].

The encoder may determine whether an optimal intra prediction mode to be applied to the current block belongs to the formerly determined MPM candidates. If the intra prediction mode of the current block belongs to the MPM candidates, the encoder may encode an MPM flag and an MPM index into a bitstream.

Referring to FIG. 7, in a step S710, an encoder/decoder may encode/decode MPM flag information. The MPM flag information may indicate whether an intra prediction mode of the current block is derived from a neighboring intra-predicted block of the current block (i.e., the intra prediction mode of the current bock belongs within MPM). For example, the MPM flag information may be referred to as prev_intra_luma_pred_flag for example, if the MPM flag information has a value of 1, it may indicate that the intra prediction mode of the current block is derived from a neighboring block (coded by intra prediction) of the current block. If the MPM flag information has a value of 0, it may indicate that the intra prediction mode of the current block is not derived from a neighboring block (coded by intra prediction) of the current block. Or, the value of the MPM flag information may be set in the other way. Or, the value of the MPM flag information may be set to a value other than 0 or 1.

If the MPM flag information indicates that the intra prediction mode of the current block is derived from the neighboring block, the encoder/decoder may encode/decode MPM index information. The MPM index information may indicate what kind of MPM mode is applied as the intra prediction mode of the current block among MPM candidates included in an MPM candidate list. For example, when the MPM candidate list is constructed like the step S630, the MPM index information may have a value of one of 0 to 2. If the MPM index information has a value of 0, an intra prediction mode of a left neighboring block in the MPM candidate list may be determined/applied as the intra prediction mode of the current block. For another example, when the MPM candidate list is constructed like the step S650, the MPM index information may have a value of one of 0 to 2. If the MPM index information has a value of 1, an intra DC mode in the MPM candidate list may be determined/applied as the intra prediction mode of the current block. The MPM index information may be referred to as mpm_idx for example.

On the contrary, if the intra prediction mode of the current block does not belong to the MPM candidates (or the MPM flag information indicates that the intra prediction mode of the current block is not derived from the neighboring block), the encoder/decoder may encode/decode intra prediction mode information of the current block into/from a bitstream. The intra prediction mode information of the current block may be referred to as rem_intra_luma_pred_mode.

The encoder may signal the intra prediction mode of the current block based on the MPM flag information (e.g., prev_intra_luma_pred_flag), the MPM index information (e.g., mpm_idx), and the intra prediction mode information (e.g., rem_intra_luma_pred_mode) of the current block. And, the decoder may obtain the intra prediction mode of the current block based on the MPM flag information (e.g., prev_intra_luma_pred_flag), the MPM index information (e.g., mpm_idx), and the intra prediction mode information (e.g., rem_intra_luma_pred_mode) of the current block.

Figure 8:
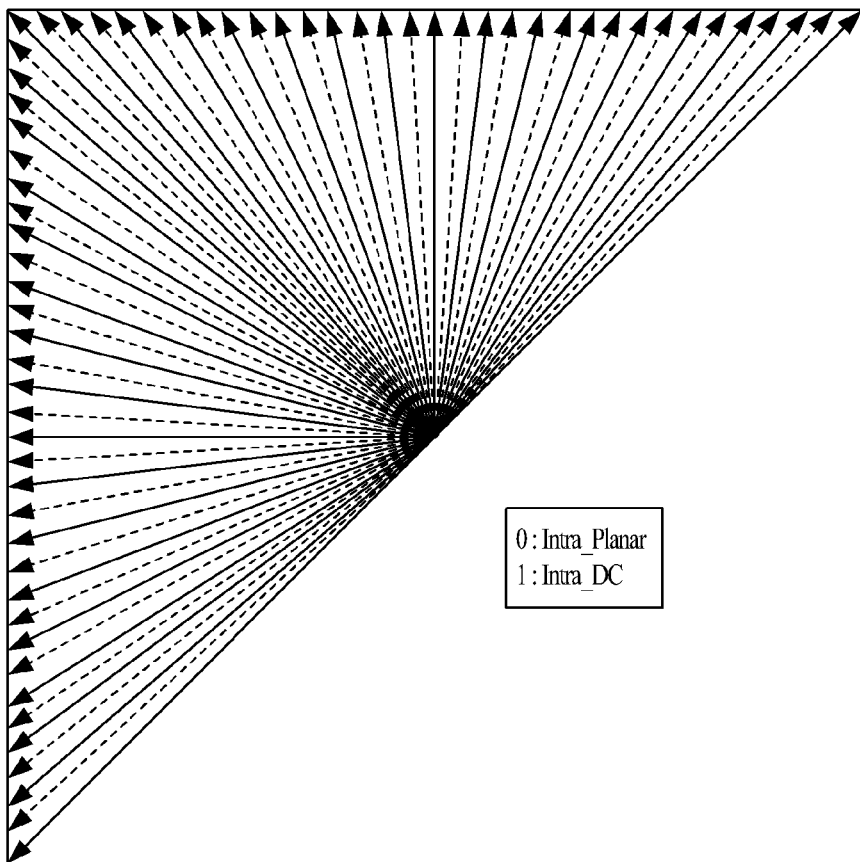
FIG. 8 illustrates an extended intra prediction mode.

FIG. 8 exemplarily shows an extended intra prediction mode.

For the intra coding and further accurate prediction of a high-resolution image, 35 types of intra prediction modes may be extended to 67 types of intra prediction modes. In FIG. 8, arrows denoted by dotted lines indicate 32 types of newly added intra angular prediction modes. For example, a value of an extended intra prediction mode may correspond to an intra prediction mode shown in Table 2 for example.

TABLE 2

| Intra prediction mode | Associated name |
|---|---|
| 0 | INTRA_PLANAR |
| 1 | INTRA_DC |
| 2 . . . 66 | INTRA_ANGULAR2 . . . INTRA_ANGULAR66 |

An intra prediction mode (INTRA_PLANAR) and an intra DC prediction mode (INTRA_DC) in the extended intra prediction mode are identical to the conventional intra planar prediction mode and the intra DC prediction mode (cf. examples, Table 1 and associated description). 32 types of newly added angular modes are applicable in all block sizes and to intra coding of luminance component and chrominance component.

Figure 9:
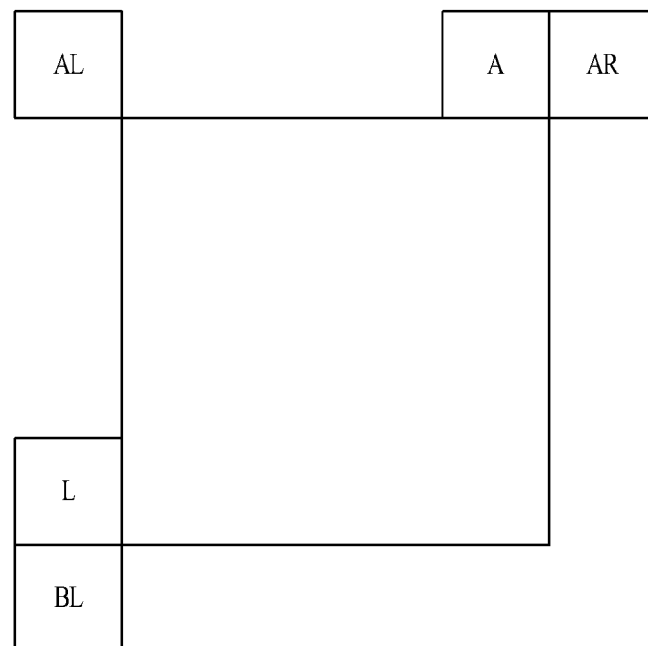
FIG. 9 illustrates MPM candidates for an extended intra prediction mode.

FIG. 9 exemplarily shows MPM candidates for an extended intra prediction mode.

As the number of intra prediction modes increases to 67, the number of Most Probable Modes (MPMs) derived from neighboring blocks for efficient coding of an intra prediction mode may be incremented 6 from 3 and a method of constructing an MPM list may be changed.

A method of constructing an MPM list based on 6 MPM candidates is mainly progressed in order of the 3 types as follows.

Use a neighboring intra prediction mode.
Use a derived intra prediction mode.
Use a default intra prediction mode.

An MPM list including 6 MPM candidates is generated, first of all, using a neighboring intra prediction mode. As exemplarily shown in FIG. 9, an intra prediction mode is added to the 6-MPM candidate list by searching 5 neighboring blocks AL, A, AR, L and BL of a block (i.e., the current block) to perform intra prediction thereon currently. In doing so, the same intra prediction mode is excluded by performing a redundancy check and a new intra prediction mode is added to the 6-MPM candidate list. For example, a search order of neighboring blocks may proceed in order of L→A→intra planar prediction mode→intra DC prediction mode→BL→AR→AL. If the 6-MPM candidate list is completed using the neighboring intra prediction modes, the candidate list generating process is ended.

If the 6-MPM candidate list is not completed using the neighboring intra prediction modes, a candidate list is constructed using a derived intra prediction mode. The derived intra prediction mode is generated by adding −1 or +1 to an intra prediction mode existing in the candidate list already, and the generated derived intra prediction mode is added to the candidate list. In this case, an identical mode is excluded by performing a redundancy check. If there is a new mode, the new mode is added to the candidate list.

If the candidate list is not still completed, a candidate list is constructed using a default intra prediction mode finally. The default intra prediction mode may include one of modes {Vertical, Horizontal, Intra_Angular2, Diagonal}. In an extended intra prediction mode, 'Vertical' may indicate a vertical prediction mode (e.g., Intra_Angular50), 'Horizontal' may indicate an intra horizontal prediction mode (e.g., Intra_Angular18), and 'Diagonal' may indicate a diagonal direction intra prediction mode (e.g., Intra_Angular34 or Intra_Angular66). A redundancy check is performed in order so as to add it to the candidate list.

Figure 10:
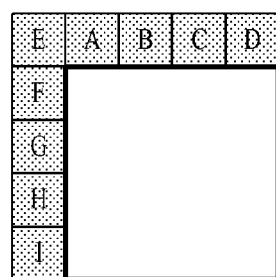
FIG. 10 illustrates neighboring reference samples used for intra prediction.
Figure 10:
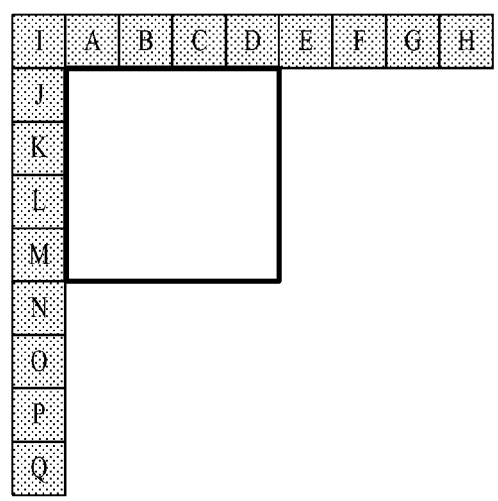

FIG. 10 exemplarily shows neighboring reference samples used for intra prediction. The example of FIG. 10 is provided to show an example only, by which the present disclosure is non-limited.

In the present specification, a neighboring reference sample is a sample of a neighboring block adjacent to a current block and refers to a sample reconstructed before the current block. Particularly, in the present specification, a neighboring reference sample refers to a reconstructed sample of a neighboring block adjacent to a current block in a current picture including the current block. A neighboring block adjacent to a current block used in the present disclosure may include, for example, at least one of a left neighboring block, a lower-left neighboring block, an upper-left neighboring block, an upper neighboring block, and an upper-right neighboring block of the current block.

Referring to FIG. 10, neighboring reference samples of a current block may include reference samples A, B, C and D of an upper neighboring block of the current block, reference samples E, F, G and H of an upper-right neighboring block of the current block, a reference sample I of an upper-left neighboring block of the current block, reference samples J, K, L and M of a left neighboring block of the current block, and reference samples N, O, P and Q of a lower-left neighboring block of the current block.

If some of reference samples are unavailable, unavailable reference samples may be generated by performing padding based on available samples.

Intra Linear Interpolation Prediction Method

Figure 11:
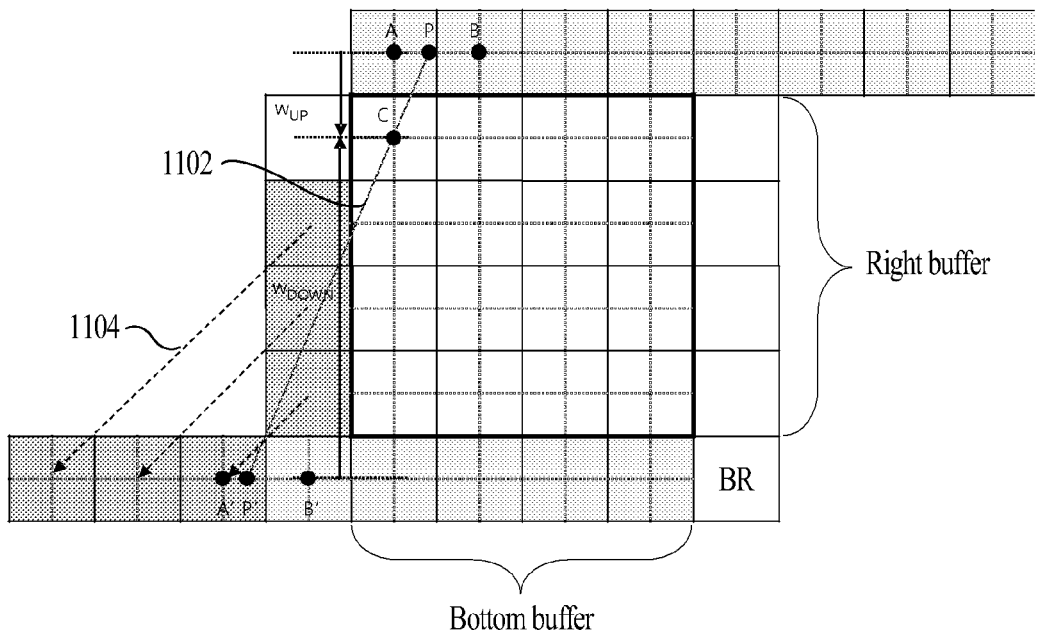
FIGS. 11 to 13 illustrates an intra linear interpolation prediction method according to the present disclosure.

FIG. 11 exemplarily shows an intra linear interpolation prediction method according to the present disclosure.

As described with reference to FIG. 1, a current block is encoded in a manner of generating a prediction value through inter encoding (inter prediction unit) or intra encoding (intra prediction unit), generating residual information between an original block and the prediction value, and passing through a transformer, a quantizer and an entropy encoder. In this case, the prediction value (i.e., a predictor or a predicted block) generated by the prediction unit (i.e., inter or intra prediction unit) is a prediction value generated from a pixel area. Since an encoded bitstream is decoded in a manner corresponding to an encoder, a prediction unit (i.e., inter or intra prediction unit) of a decoder may generate a predictor in the same manner as the encoder. Therefore, although the following is described by focusing on an encoding process, the same/similar method is applicable to a decoding process.

In case of HEVC standard, as shown in FIG. 5, for intra prediction, a predictor of a current block is generated using total 35 kinds of prediction methods including 33 kinds of directional prediction methods and 2 kinds of non-directional prediction methods. In this case, to predict a current block, a prediction sample is generated using neighboring reference samples (e.g., see FIG. 10), and then copied along prediction directivity. Namely, a predictor for the sample of the current block is set to a value of the generated prediction sample. As intra prediction simply copies a prediction sample, an error tends to increase if a distance between the prediction sample and a reference sample increases.

In order to reduce an error generated from such intra prediction encoding, Linear Interpolation Prediction (LIP) generates a right buffer and a bottom buffer and then generates a predictor by interpolating it with a conventional reference sample. The right buffer refers to a reference sample located adjacent to a right side of a current block, and the bottom buffer refers to a reference sample located adjacent to the bottom of the current block. As video encoding performs encoding with a raster scan in general, since a right neighboring block and a bottom neighboring block of the current block are not encoded yet, samples of the right and bottom neighboring blocks of the current block are unavailable. Instead, the right buffer and the bottom buffer are generated and then used. A method of generating the right buffer and the bottom buffer will be described below in detail with reference to FIG. 13.

Referring to FIG. 11, for clarity of description, a current block is assumed as having a 4×4 size, intra linear interpolation prediction is assumed as performed for a mode of a vertical series having a positive directivity 1102, and a line 1102 indicating a prediction direction centering on a pixel C of the current block is assumed as passing through a positions P between samples A and B at integer positions and a position P' between samples A' and B' at integer positions. The reference sample P at a prime number position may be obtained by performing (linear) interpolation based on the reference samples A and B adjacent to the top of the current block, and the reference sample P' at a prime number position may be obtained by performing (linear) interpolation based on the reference samples A' and B' of the bottom buffer. The reference sample of the bottom buffer may be generated in a manner of copying a reference sample adjacent to a left of the current block onto the position A' having the same horizontal coordinate as a pixel adjacent to the bottom of the current block in a bottom left diagonal direction [1104], including the reference sample B' of a bottom left of the current block as it is, or, performing (linear) interpolation based on the reference sample B' of the bottom left neighboring block and a bottom right reference sample BR as described with reference to FIG. 13.

In the example of FIG. 11, when intra linear interpolation prediction is applied, a method of generating a predictor for the pixel C of the current block is described as follows. By applying 2) to 4) in the following to all samples in the current block, a predictor is generated. An intra linear interpolation prediction method according to the present disclosure is applicable to all directivity modes (e.g., intra angle prediction mode) except a planar mode having no directivity and a DC mode.

1) Generating a bottom buffer. As described above, a reference sample of a bottom buffer may be generated in a manner of copying left reference samples (dark gray) onto a bottom sample buffer or using bottom samples generated from performing (linear) interpolation based on a reference sample B' of a bottom left neighboring block and a bottom right reference sample BR.

2) Generating a prediction sample value P by interpolating a reference sample A and a reference sample B of a top reference buffer using a reconstructed value [Use a prediction sample generating method of the conventional intra encoding].

3) Generating a prediction sample value P' by interpolating a reference sample A' and a reference sample B' of a newly generated bottom reference buffer [Use a prediction sample generating method of the conventional intra encoding].

4) Generating a final predictor C for a pixel of a current block by linearly interpolating the generated P and P' [See Equation 1]. Weights $w_{UP}$ and $w_{DOWN}$ used for the linear interpolation may be given as vertical distances between a current pixel and P and P' (or a difference between vertical coordinates). For example, $w_{UP}$ in the example of FIG. 11 may be set to 1 and $w_{DOWN}$ may be set to 4.

$$C=(w_{up}*P+w_{DOWN}*P'+(w_{UP}+w_{DOWN})/2)/(w_{UP}+w_{DOWN})$$ [Equation 1]

If the line 1102 indicating the prediction direction passes through the samples A, B, A' and B' at the integer positions, a predictor for a pixel of a current block may be generated by performing (linear) interpolation based on the reference samples at the integer positions in the top and bottom buffers without performing (linear) interpolation to generate the reference samples P and P' at the prime number positions. For example, when the line 1102 indicating a prediction direction passes through the reference sample A or B at the integer position, the steps 2) and 3) may be skipped from the above method and the predictor C for the pixel of the current block in the step 4) of the above method may be generated using reference samples at integer positions of the bottom and top buffers instead of P and P'. Yet, Weights $w_{UP}$ and $W_{DOWN}$ used for linear interpolation may be given identically as described in the step 4).

If a mode of a horizontal series having positive directivity is used, a right buffer may be used instead of a bottom buffer. Similarly to the description of the example of FIG. 11, reference samples of the right buffer may include a reference sample generated by copying a top reference sample adjacent to a current block in a top right diagonal direction, a reference sample B' of a bottom left neighboring block of the current block, and, as described with reference to FIG. 13, a reference sample generated by performing (linear) interpolation based on the reference sample B' of the bottom left neighboring block and a bottom right reference sample BR. In addition, similarly to the example of FIG. 11, a reference sample P adjacent to a left of the current block may be generated by performing (linear) interpolation based on a left reference sample, a right reference sample P' may be generated by performing (linear) interpolation based on the right buffer, and a predictor C for a current pixel may be generated based on linear interpolation between the left reference sample P and the right reference sample P'. In this case, weights $w_{left}$ and $w_{right}$ for linear interpolation may be given as horizontal distances (or differences between horizontal coordinates) between the current pixel and P and P' and used instead of $w_{UP}$ and $w_{DOWN}$ in Equation 1.

Figure 12:
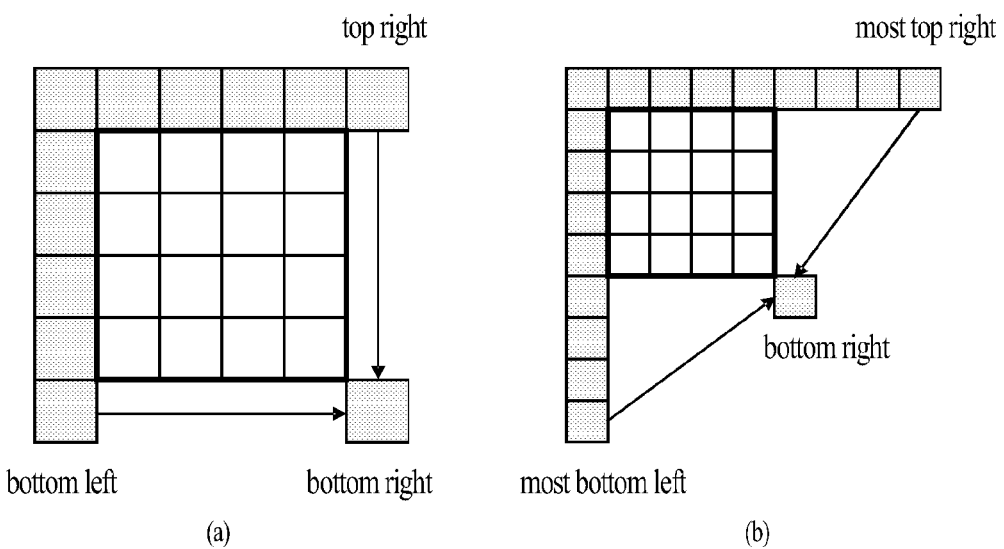

FIG. 12 exemplarily shows a method of generating a bottom right sample BR to perform intra LIP. As described above, it is necessary to generate a right (sample) buffer and a bottom (sample) buffer to perform linear interpolation prediction. To this end, a bottom right sample BR is generated using neighboring reference samples.

FIG. 12(*a*) shows a method of generating a bottom right sample BR using a top right sample (referred to as TR) and a bottom left sample (referred to as BL). The TR refers to a top right neighboring reference sample adjacent to a current block of a reference sample located at a bottom left corner in a top right neighboring block. The BL refers to a bottom left neighboring reference sample adjacent to the current block or a reference sample located at a top right corner in a bottom left neighboring block adjacent to the current block.

FIG. 12(*b*) shows a method of generating a bottom right sample BR using a most top right sample (referred to as MTR) in a distance twice longer than a current block and a most bottom left sample (referred to as MBL). The MTR refers to a bottom right corner reference sample in a top right neighboring block adjacent to a top right of the current block and having the same size of the current block, and the MBL refers to a bottom right corner reference sample in a bottom left neighboring block adjacent to a bottom left of the current block and having the same size of the current block.

In case of applying the example of FIG. 12(*a*), the bottom right sample BR may be obtained based on interpolation (e.g., Equation 2). In case of applying the example of FIG. 12(*b*), the bottom right sample BR may be obtained based on interpolation (e.g., Equation 3). In Equations 2 and 3, '>>' refers to a right shift operation.

$$BR=(TR+BL+1)>>1$$ [Equation 2]

$$BR=(MTR+MBL+1)>>1)$$ [Equation 3]

The present disclosure is non-limited by the example of FIG. 12, and the bottom right sample BR for the present disclosure may be generated using various methods as well as the above-mentioned two kinds of methods.

Figure 13:
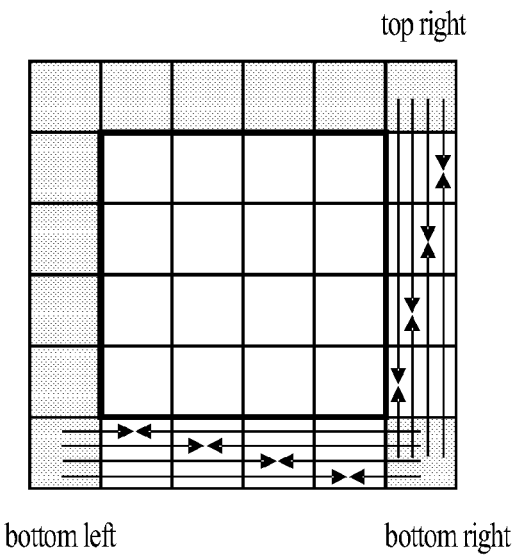

FIG. 13 exemplarily shows a method of generating a bottom buffer and a right buffer to perform intra LIP. After a bottom right sample BR has been generated, bottom (reference) samples (bottom buffer) and right (reference) samples (right buffer) are generated using a bottom left reference sample BL and a top right reference sample TR.

Referring to FIG. 13, bottom (reference) samples of a current block are generated by linear-interpolating a bottom left sample BL and a bottom right sample BR and right (reference) samples of the current block are generated by linear-interpolating a top right sample TR and a bottom right sample. For example, a bottom (reference) sample may be generated by performing linear interpolation in a manner of applying a weight based on a horizontal distance (or a difference of horizontal coordinates) to each of the bottom left sample BL and the bottom right sample BR, and a right (reference) sample may be generated by performing linear interpolation in a manner of applying a weight based on a vertical distance (or a difference of vertical coordinates) to each of the top right sample TR and the bottom right sample BR. Besides, bottom (reference) samples may be generated in various ways in a manner of giving various weights using the bottom left sample BL and the bottom right sample BR, and right (reference) samples may be generated in various ways in a manner of giving various weights using the top right sample TR and the bottom right sample BR.

Figure 14:
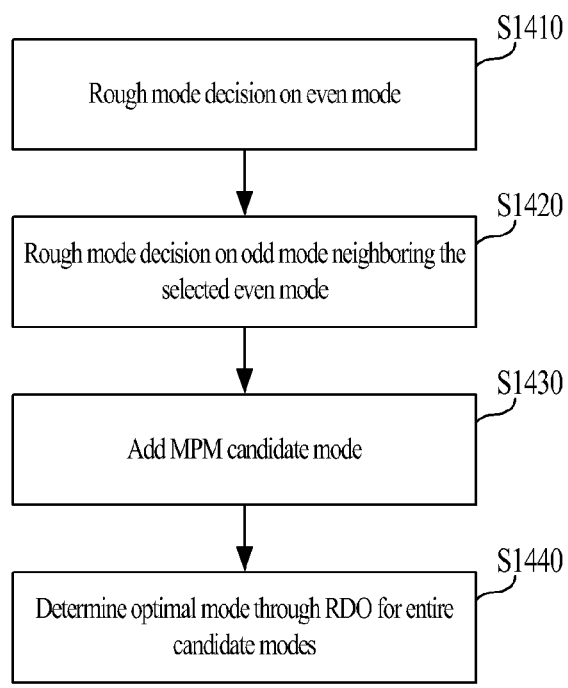
FIG. 14 illustrates a flowchart of a method of determining an optimal prediction mode in intra prediction encoding.

FIG. 14 exemplarily shows a flowchart of a method of determining an optimal prediction mode in intra prediction encoding.

Referring to FIG. 14, first of all, a method of determining an optimal prediction mode in intra prediction encoding determines a candidate even mode for full Rate-Distortion (RD) through Rough Mode Decision (RMD) on an even mode [S1410]. The Rough Mode Decision (RMD) refers to a method of determining a cost value based on a difference between an original pixel value of a current block and a predictor and the bit number necessary to encode mode information simply and determining a mode having a less cost value as a candidate mode. For example, the cost value may be determined based on Equation 4 described in association with Method 2 of the present disclosure. For another example, the cost value may be determined by applying SAD or SSD instead of SATD in Equation 4. The even mode refers to an intra prediction mode corresponding to an even number. For example, referring to FIG. 5, the even mode may include an intra planar prediction mode corresponding to a value of 0, an intra horizontal prediction mode corresponding to a value of 10, an intra vertical prediction mode corresponding to a value of 26, etc. The full RD refers to a process for determining an optimal prediction mode based on the bit number generated by completely encoding a current block for each given intra prediction mode candidate through transform, quantization and entropy encoding and a degree of distortion generated from reconstructing the current block again.

Subsequently, a candidate mode for the full RD is re-determined through the rough mode decision again on an odd mode (e.g., an odd mode, which results from adding ±1 when a selected even mode is 20, is a mode #19 (INTRA_ANGULAR19) or a mode #21 INTRA_ANGULAR21)) resulting from adding ±1 to the even mode determined in the step S1410 [S1420]. For example, N (positive integer) candidate modes may be determined in the step S1410. Moreover, in the step S1410, N candidate modes may be re-determined again through the rough mode decision on (2*N+1) modes including N candidate modes and neighboring odd modes.

Alternatively, after performing the touch mode decision on the odd mode in the step S140, the touch mode decision on the even mode resulting from adding ±1 to the determined odd mode may be performed in the step S1420.

After determining the candidate mode through the rough mode decision, a similar mode around the current block is found using the Most Probable Method (MPM) (e.g., see FIG. 6 & associated description, FIG. 9 & associated description, or FIG. 23 & associated description) and then added to the candidate modes [S1430].

Finally, an optimal intra prediction mode is determined through the full RD from the perspective of Rate-Distortion Optimization (RDO) for the candidate modes generated through the step S1430 [S1440].

Figure 15:
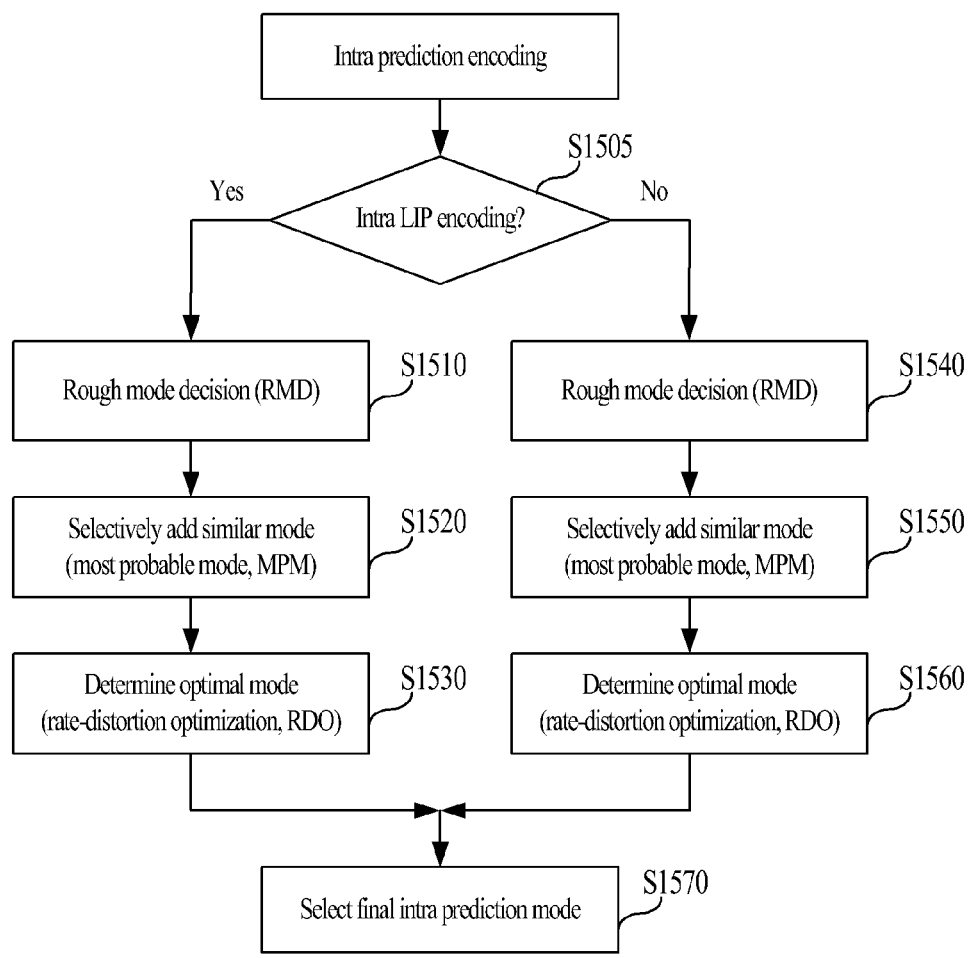
FIG. 15 illustrates a flowchart of an intra prediction encoding method including a liner interpolation intra prediction method.

FIG. 15 exemplarily shows a flowchart of an intra prediction encoding method including a liner interpolation intra prediction method.

Referring to FIG. 15, after determining a presence or non-presence of linear interpolation intra prediction encoding [S1505], an encoder selects candidate modes to use in determining an optimal mode through rough mode decision on both a conventional intra prediction mode and a linear interpolation intra prediction mode [S1510, S1540]. For example, in case of performing encoding based on the linear interpolation intra prediction mode, a candidate mode may be determined by applying rough mode decision to each linear interpolation intra prediction mode. For another example, a candidate mode can be determined by performing rough mode decision in a manner of dividing into an odd mode and an even mode (except an intra planar prediction mode and an intra DC prediction mode) like the steps S1410 and S1420 of FIG. 14. For example, in case of performing encoding based on a conventional intra prediction mode, a candidate mode can be determined by applying rough mode decision to each intra prediction mode or performing rough mode decision in a manner of dividing into an odd mode and an even mode.

Subsequently, a similar mode is added using the Most Probable Method (MPM) (e.g., see FIG. 6 & associated description, FIG. 9 & associated description, or FIG. 23 & associated description) [S1520, S1550].

Finally, an optimal intra prediction mode is determined through Rate-Distortion Optimization (RDO) for the determined candidate mode [S1530, S1560].

The intra prediction encoding method of FIG. 15 applies the conventional intra prediction encoding and the linear interpolation intra prediction encoding to all intra prediction modes and then determines an optimal mode, whereby complexity is high.

Method 1

In Method 1 of the present disclosure, a new linear interpolation intra prediction encoding/decoding method is proposed to lower complexity and raise coding efficiency in a manner of changing a linear interpolation intra prediction coding method in the conventional intra prediction coding method. Particularly, Method 1 of the present disclosure proposes a method of changing a linear interpolation intra prediction encoding/decoding method in the conventional intra prediction encoding/decoding method described with reference to FIG. 15 and FIG. 16.

Figure 16:
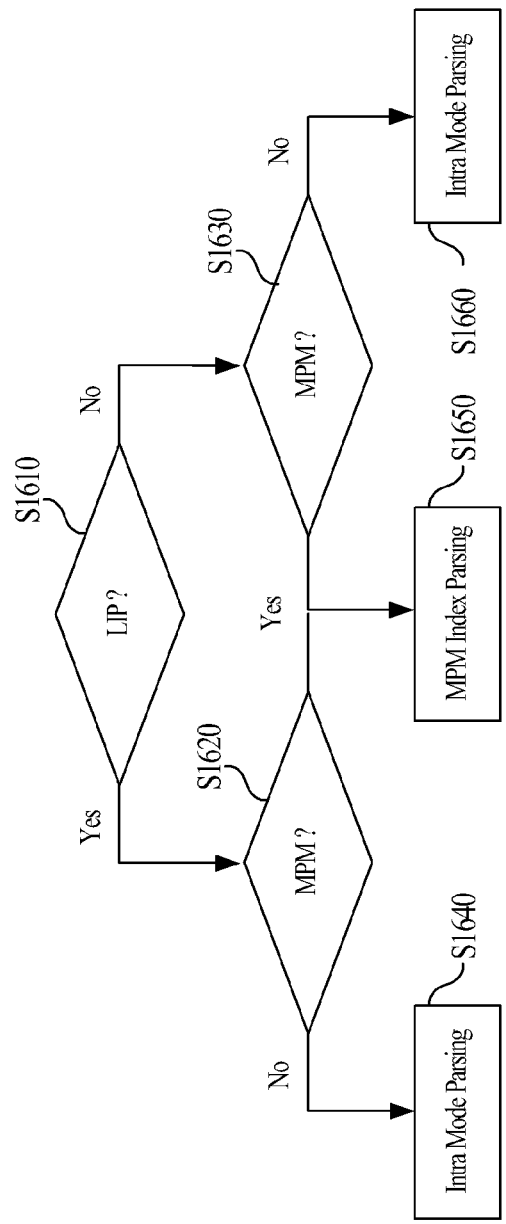
FIGS. 16 to 19 illustrate decoding procedures for an intra prediction coding method according to the present disclosure.

FIG. 16 exemplarily shows a decoding process for an intra prediction coding method according to the present disclosure.

Referring to FIG. 16, in the conventional intra prediction decoding, first of all, a presence or non-presence of LIP for a current block is checked [S1610]. For example, a decoder obtains information indicating whether an intra LIP mode is applied for a current block from a bitstream and may then determine whether the intra LIP mode is applied for the current block based on the obtained information. For clarity, in the present specification, the information indicating whether an intra LIP mode is applied for a current block may be referred to as LIP information, LIP flag information, or first flag information. For example, if a value of LIP information is 1, the intra LIP mode is applied. If a value of LIP information is 0, the intra LIP mode may not be applied. The value of the LIP information may be set contrariwise. A different value may be assigned to the value of the LIP information.

If the current block is an LIP block (or if intra LIP is applied for a current block), a presence or non-presence of MPM (or, whether an intra prediction mode of the current block is derived from a neighboring block) is checked [S1620]. Depending on a result of the check, whether to parse intra mode information [S1640, S1660] and whether to parse MPM index information [S1650] are determined. 'Parse' refers to an operation of obtaining syntax information from a bitstream by entropy-decoding a bitstream. For example, the step S1620, the step S1640 and the step S1650 may be performed by the method described with reference to FIG. 7. In this case, if an intra angular prediction mode is determined as an intra prediction mode of the current block, a predictor for the current block is obtained (see FIGS. 11 to 13 and associated descriptions) by applying the intra LIP mode based on a direction indicated by the determined intra angle prediction mode (e.g., by setting the line 1102) and the current block can be reconstructed based on the obtained predictor.

If the current block is not an LIP block but an HEVC block (or if intra LIP is not applied for the current block), a presence or non-presence of MPM (or, whether an intra prediction mode of the current block is derived from a neighboring block) is checked like LIP [S1630]. Depending on a result of the check, whether to parse intra mode information [S1640] and whether to parse MPM index information [S1650] are determined. For example, the step S1630, the step S1650 and the step S1660 may be performed by the method described with reference to FIG. 7.

In case of the method exampled in FIG. 16, irrespective of whether a current block is an LIP block or a conventional HEVC block, an intra prediction mode for the current block is determined in the same manner as the conventional manner (e.g., see FIG. 7 & associated description). Therefore, as an amount of operation required for encoding is increased due to the intra LIP mode addition, encoder performance may be degraded. Since information (or LIP information) indicating whether the intra LIP mode is applied for the current block should be additionally signaled as well as the conventional syntax information, the number of the encoded bits may be increased.

Therefore, Method 1 of the present disclosure proposes various methods for preventing encoder performance degradation and the bit number increase while improving intra prediction performance by adding an intra LIP mode.

Method 1-1

Figure 17:
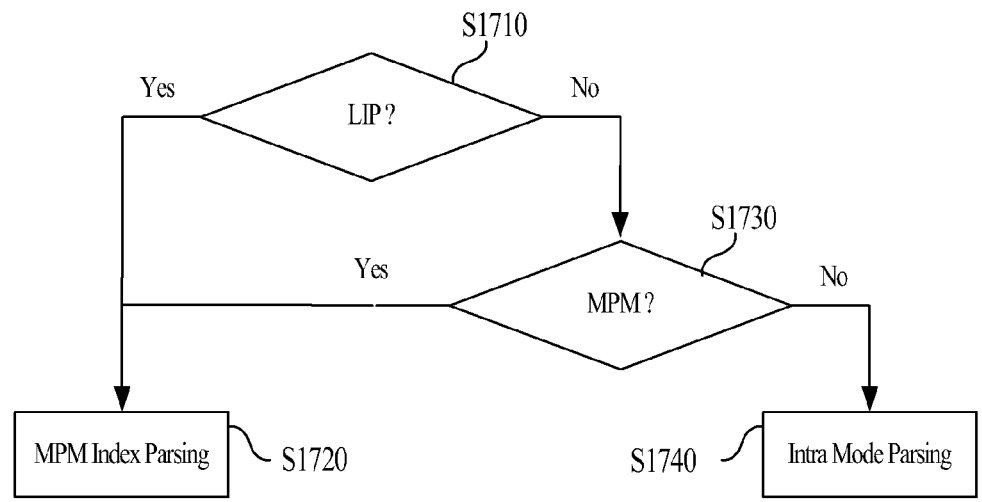
Figure 17:
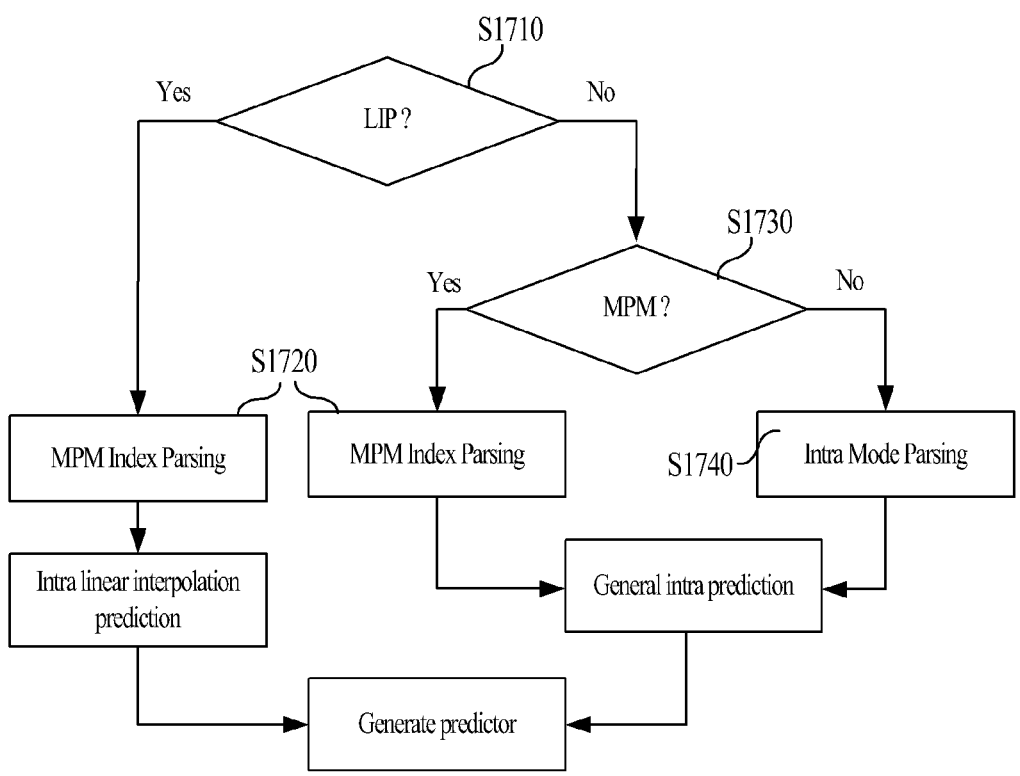

FIG. 17 exemplarily shows a new linear interpolation intra prediction decoding process according to Method 1-1 of the present disclosure. FIG. 17(a) schematically shows an example of a flowchart of Method 1-1 of the present disclosure for comparison with FIG. 16, and FIG. 17(b) shows an example of a flowchart of Method 101 of the present disclosure including a predicted block generating operation.

Referring to FIG. 17(a), a new linear interpolation intra prediction decoding process proposed by the present disclosure directly parses MPM index information without the parsing of MPM flag information (see S1620) if a current block is an LIP block (or if intra LIP is applied for a current block) in comparison with the intra prediction encoding method of FIG. 16 [S1720]. In Method 1-1 of the present disclosure, if the current block is the LIP block (or if intra LIP is applied for the current block), a mode generated through the MPM method (e.g., see FIG. 6 & associated description, FIG. 9 & associated description, or FIG. 23 & associated description) is limited as a candidate mode. Therefore, if the current block is the LIP block (or if intra LIP is applied for the current block), bits for the encoding of MPM flag information (e.g., prev_intra_luma_pred_flag) can be reduced.

In FIG. 17(a), a step S1710 may correspond to the step S1610 of FIG. 16, a ste3p S1730 may correspond to the step S1630 of FIG. 16, and a step S1740 may correspond to the step S1660 of FIG. 16. Hence, the descriptions of the steps S1610, S1630 and S1660 may be identically/similarly applicable to the steps S1710, S1730 and S1740, respectively.

Referring to FIG. 17(b), if the LIP information indicates that the intra LIP mode is applied for the current block in the step S1710, a decoder may directly obtain MPM index information (e.g., mpm_idx) from a bitstream without parsing MPM flag information (e.g., prev_intra_luma_pred_flag) (or by skipping the parsing of the MPM flag information) [S1720]. Subsequently, the decoder determines an intra prediction mode indicated by the MPM index information in an MPM candidate list as an intra prediction mode of the current block and may then obtain a predictor for the current block by performing intra LIP based on a direction (e.g., 1102) indicated by the determined intra prediction mode (e.g., see FIGS. 11 to 13 & associated descriptions).

In the step S1710, if the LIP information indicates that the intra LIP mode is not applied for the current block, the decoder determines an intra prediction mode of the current block according to a conventional method (e.g., see FIGS. 6 and 7 & associated descriptions) and may obtain a predictor for the current block by a conventional intra prediction method (see FIG. 5 & associated description).

The MPM index information obtained in the step S1720 may have a different value depending on whether the intra LIP is applied. Likewise, the MPM candidate list may be configured to include different candidate modes. For example, when an intra prediction mode of a neighboring block includes a intra planar prediction mode or an intra DC prediction mode and intra LIP is applied to the current block, an MPM candidate list for LIP and an MPM candidate list for the conventional intra prediction method may be configured different from each other, whereby a value of the MPM index information may be configured differently. Therefore, the MPM index information for LIP in the present specification may be referred to as a first index information and MPM index information for a conventional intra prediction method may be referred to as a second index information. Yet, an MPM candidate list may be configured identical irrespective of a presence or non-presence of intra LIP application. In this case, the first index information and the second index information may be configured identical to each other.

Thus, based on the above obtained predictor, the decoder reconstructs the current block.

Figure 18:
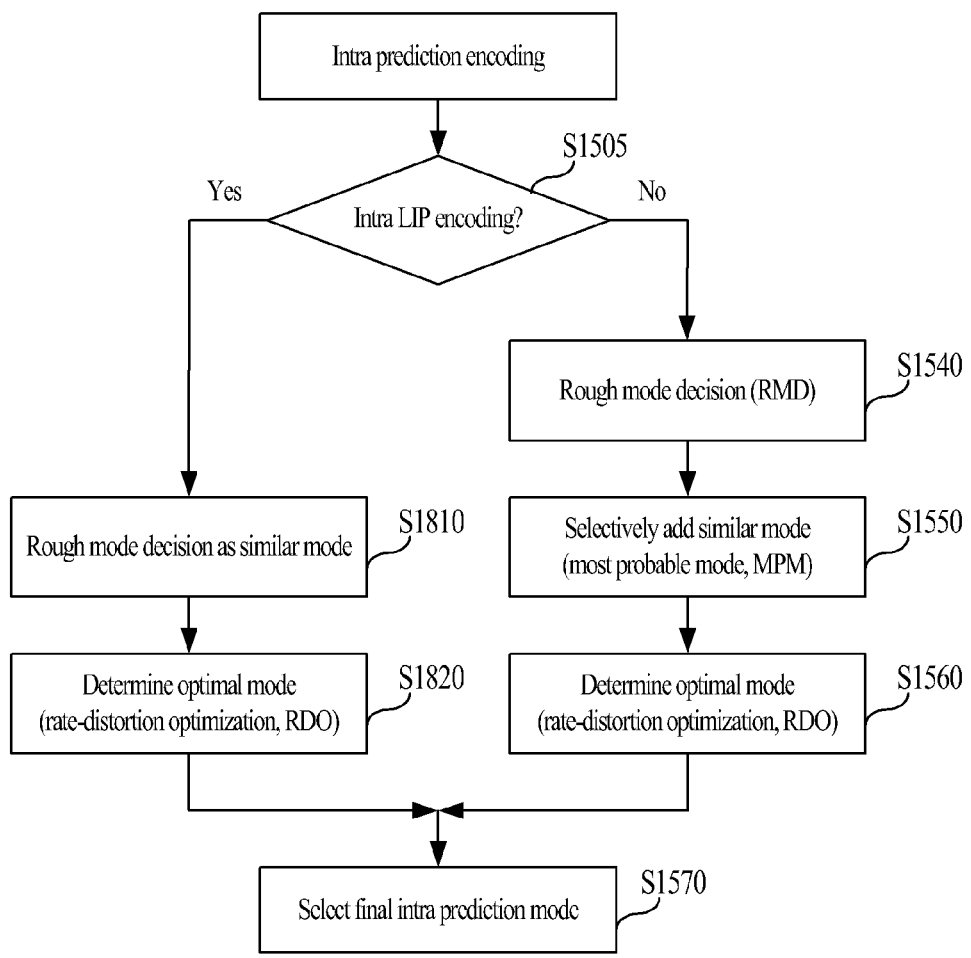

FIG. 18 exemplarily shows an intra prediction coding method including a new linear interpolation intra prediction encoding method according to Method 1-1 of the present disclosure.

Referring to FIG. 18, a general intra prediction encoding method determines an optimal mode through the same process as a conventional method (See S1540 to S1570). Particularly, an encoder determines a presence or non-presence of linear interpolation intra prediction encoding [S1505], and may then determine an intra prediction mode for a current block, as described with reference to the steps S1540 to S1570, in case of encoding the current block by applying a conventional intra prediction mode.

On the other hand, unlike the former linear interpolation intra prediction encoding method of the method described with reference to FIG. 15, a linear interpolation intra prediction encoding method skips the rough mode decision step S1510 and the optional similar mode adding step S1520 and determines a candidate mode for determining an optimal mode using the rough mode decision [S1810].

In the step S1810, a method of determining a rough mode as a similar mode of a new linear interpolation intra prediction encoding method proposed by the present disclosure is a method of determining a candidate mode selected through the MPM method (e.g., see FIG. 6 & associated description, FIG. 9 & associated description, or FIG. 23 & associated description) as a candidate mode for optional mode decision. The conventional method determines a small number of candidate modes through a rough mode decision method, adds some of modes selected by an MPM method to candidate modes, and uses the generated candidate modes for determining an optimal mode (e.g., see the steps S1510 and S1520). Yet, in Method 1-1 of the present disclosure, all the candidate modes selected simply through the MPM method are used as candidate modes for the optimal mode determination.

For example, M (positive integer) candidate modes are determined in the MPM candidate list configured by the method described with reference to FIG. 6 or FIG. 8 or the method described with reference to FIG. 23 [S1810], intra LIP based encoding is performed for the determined M MPM candidates, and an optimal intra prediction mode is determined based on rate distortion optimization [S1820]. Thus, the determined optimal intra prediction mode is selected as an intra prediction mode of the current block [S1570], and the encoder may encode the current block based on the selected intra prediction mode.

As described above, when the new linear interpolation intra prediction encoding method proposed in FIG. 18 is used, if a current block is a block encoded in a linear interpolation intra prediction mode, since it is unnecessary to encode MPM flag information, bits required for the MPM flag information can be reduced. In addition, since the rough mode decision {S1510} on the entire intra prediction mode candidates is skipped, degradation of encoder performance and coding efficiency can be prevented while intra prediction performance is improved.

Method 1-1 of the present disclosure proposes the structure of encoding/decoding LIP information first. Namely, as described with reference to FIG. 17, a decoder parses LIP information first and then determines whether to parse MPM flag information depending on whether a linear interpolation intra prediction method is used. In this case, although all blocks use the LIP information, if a current block uses linear interpolation intra prediction (e.g., a case that LIP information is on or a case that it is 'yes' in the step S1710 of FIG. 17), MPM flag information is not parsed, whereby bits for the MPM flag information can be saved.

Method 1-2

Method 1-2 of the present disclosure proposes another linear interpolation intra prediction structure of decoding MPL flag information first by changing a processing order of LIP information and MPM flag information in a manner of modifying Method 1-1.

Figure 19:
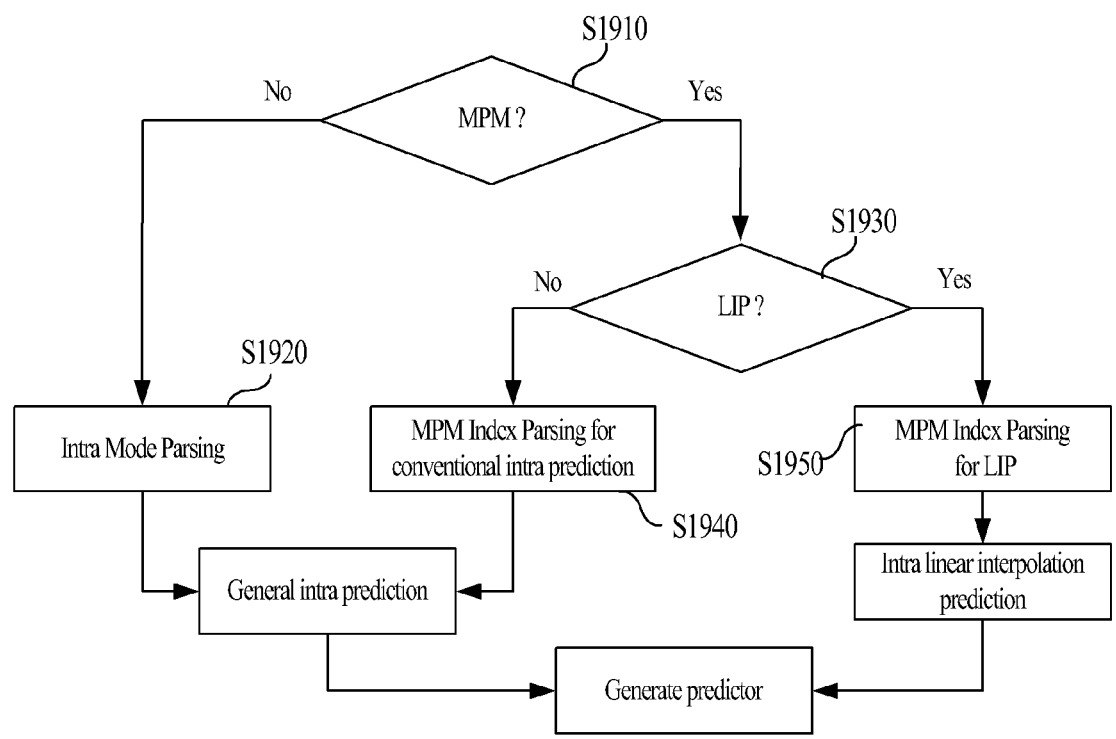

FIG. 19 exemplarily shows a new linear interpolation intra prediction decoding process according to Method 1-2 of the present disclosure.

Referring to FIG. 19, first of all, a decoder parses MPM flag information [S1910] and then determines whether to parse LIP information depending on a presence or non-presence of MPM [S1930]. Particularly, the decoder obtains the MPM flag information from a bitstream [S1910]. If an intra prediction mode of a current block is not derived from a neighboring block of the current block, the decoder may obtain intra prediction mode information (e.g., rem_intra_luma_pred_mode) from the bitstream [S1920]. In this case, as the decoder can obtain a predictor of the current block and reconstruct the current block in the same manner of the conventional intra prediction method, the step of obtaining the LIP information from the bitstream may be skipped.

If the MPM flag information indicates that an intra prediction mode of a current block is derived from a neighboring block of the current block [S1910], the decoder obtains LIP information from the bitstream and may then determine whether to apply an intra LIP method or a conventional intra prediction method [S1930]. In case of applying the intra LIP method according to the LIP information, MPM index information (or a first index information) may be obtained from the bitstream [S1950], an intra prediction mode indicated by the MPM index information (or the first index information) in an MPM candidate list may be determined as an intra prediction mode of the current block, and a predictor of the current block may be obtained by performing the intra LIP method (e.g., see FIGS. 11 to 13 & associated descriptions) based on the determined intra prediction mode. In case of applying the conventional intra prediction method according to the LIP information, MPM index information (or a second index information) may be obtained from the bitstream [S1940], an intra prediction mode indicated by the MPM index information (or the second index information) in the MPM candidate list may be determined as an intra prediction mode of the current block, and a predictor of the current block may be obtained by performing the conventional intra prediction method (e.g., see FIGS. 6 and 7 & associated descriptions) based on the determined intra prediction mode.

When Method 1-2 of the present disclosure is applied, MPM flag information is used for all blocks. If a current block does not apply MPM (or if an intra prediction mode of a current block is not derived from a neighboring block, or if MPM flag information is off, or if it is 'no' in the step S1910 of FIG. 19), as LIP information is not parade, bits for the LIP information can be saved.

Method 2

Method 2 of the present disclosure proposes a method of reducing complexity of a new linear interpolation intra prediction structure proposed by Method 1 of the present disclosure. Generally, an MPM index assigns a low index number to a mode having a high occurrence frequency or a high index number to a mode having low occurrence frequency. From the perspective of entropy coding, a small amount of bits are allocated to a mode having high occurrence frequency or a large amount of bits are allocated to a mode having low occurrence frequency, whereby efficient encoding can be performed. Therefore, in general, it is highly probable that a mode having a low index number becomes an optimal mode of a current block. Based on such a fact, a method of reducing complexity of a new linear interpolation intra prediction structure is proposed.

Method 2 of the present disclosure may apply to determining a candidate mode for determining an optimal intra prediction mode for a current block efficiently by applying the aforementioned intra prediction method. For example, Method 2 of the present disclosure may apply to the step S1520 of FIG. 15 or the step S1810 of FIG. 18, and further apply to the step S1430 of FIG. 14, the step S1550 of FIG. 15, or the step S1550 of FIG. 18.

Figure 20:
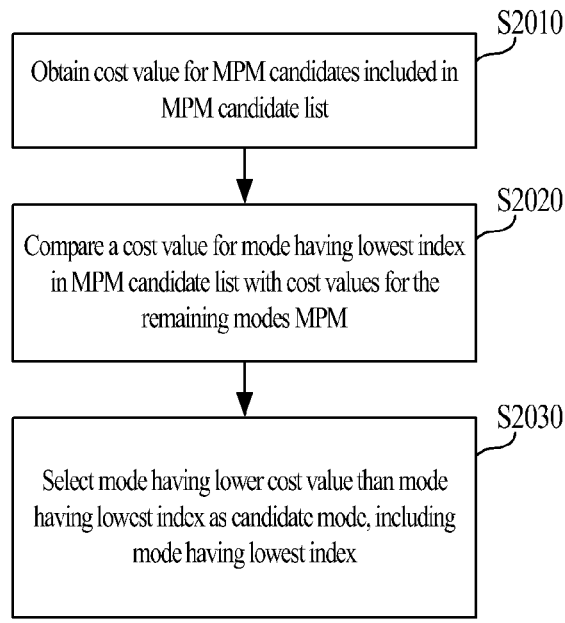
FIG. 20 illustrates a flowchart of a method of determining a candidate mode for an optimal intra prediction mode according to the present disclosure.

FIG. 20 exemplarily shows a flowchart of applying Method 2 of the present disclosure.

In a step S2010, an encoder obtains a cost value for MPM candidate modes included in an MPM candidate list. Particularly, the encoder may obtain a cost value for each MPM candidate mode based on a predictor obtained by applying an intra prediction mode included in the MPM candidate list each and an original pixel value of a current block. A method of obtaining a cost value is described in detail as follows.

In a step S2020, the encoder compares a cost value for an intra prediction mode having a lowest index (e.g., 0) among the MPM candidate modes included in the MPM candidate list with a cost value for each of the remaining modes. For example, as described with reference to FIG. 6, assuming that the MPM candidate list includes 3 MPM candidate modes MPM[0] to MPM[2], a cost value for MPM[0] and a cost value for MPM[1] may be compared with each other and a cost value for MPM[0] and a cost value for MPM[2] may be compared with each other. For another example, assuming that the MPM candidate list includes 6 MPM candidate modes, a cost value for MPM[0] and a cost value for each of the remaining MPM[1] to MPM[5] may be compared with each other.

In a step S2030, the encoder may determine a candidate mode for determining an optimal intra prediction mode based on the comparison result. Particularly, candidate modes for determining an optimal intra prediction mode may include a mode (e.g., MPM[0]) having the lowest index in the MPM candidate list and a mode having a cost value lower than that for the mode having the lowest index.

For example, as described with reference to FIG. 6, assuming that the MPM candidate list includes 3 MPM candidate modes, candidate modes for determining the optimal intra prediction mode may include a mode MPM[1] or MPM[2] having a cost value smaller than that for MPM[0] and the candidate mode MPM[0]. For another example, as described with reference to FIG. 9, assuming that the MPM candidate list includes 6 MPM candidate modes, candidate modes for determining the optimal intra prediction mode may include a mode having a cost value smaller than that for MPM[0] among MPM[1] to MPM[5] and the candidate mode MPM[0].

The cost value for Method 2 of the present disclosure may be mainly calculated using two kinds of methods.

1) Distortion Considered Method

A distortion considered method calculates a cost value using various methods such as Sum of Absolute transformed Differences (SATD), Sum of Absolute Differences (SAD), Sum of Square Differences (SSD) and the like, between a predictor of a current block and an original pixel value of the current block. Particularly, a cost value for Method 2 of the present disclosure may be obtained based on SATD, SAD or SSD between a predictor of a current block and an original pixel value of the current block. SATD refers to a sum of absolute differences between transform coefficient levels obtained by performing transform on a predictor of a current block and an original pixel value of the current block. For example, Hadamard transform is applicable to find SATD. SAD refers to a sum of absolute differences between a predictor of a current block and an original pixel value of the current block. SSD refers to a sum of square differences between a predictor of a current block and an original pixel value of the current block.

2) Rough Mode Decision (RMD) Considered Method

A method of considering RMD for a cost value uses the RMD method used in the intra prediction encoding method described with reference to FIG. 15. As described in association with the step S1410 of FIG. 14, the RMD method refers to a method of determining a cost value based on a difference between an original pixel value and a predictor and prediction on the bit number necessary to encode mode information and then determining a mode having a small cost value as a candidate mode.

Particularly, a cost value for Method 2 of the present disclosure is calculated in a manner of determining a distortion value by calculating a distortion degree (e.g., SATD) between a predictor of a current block and an original pixel value of the current block, predicting the bit number B used for prediction mode encoding, and then calculating the cost value in consideration of Lagrange constant (multiplier)($\lambda$). For example, a cost value for Method 2 of the present disclosure may be obtained according to Equation 4, where RMDcost indicates a cost value for Method 2 of the present disclosure.

$$RMDcost=SATD+(\lambda*B) \quad \text{[Equation 4]}$$

For another example, a cost value of the present disclosure may be obtained using SAD or SSD by modifying Equation 4.

In some implementations, the balance between complexity and performance of Method 2 of the present disclosure may be adjusted by changing a cost value of a mode (e.g., MPM index 0 mode) having a lowest index in an MPM candidate list. For example, a cost value of the MPM index 0 mode may be adjusted through Equation 5. In Equation 5, MPMindex0_cost indicates a cost value of the MPM index 0 mode and MPMindex0_cost' indicates an adjusted cost value.

$$MPMindex0\_cost'=\alpha*MPMindex0\_cost \quad \text{[Equation 5]}$$

In Equation 5, a value of $\alpha$ may be given as a positive real number. As shown in Equation 5, a cost value of the MPM index 0 may be changed using the value of $\alpha$. Through this, candidate modes to be used for a process for determining an optimal mode among MPM index 1 mode to MPM index 5 mode can be selected selectively. Through this, the balance between complexity and performance can be controlled. For example, the bigger the $\alpha$ value increases, the more candidate modes can be selected. Therefore, complexity of the encoding method according to the present disclosure may increase and encoding performance may decrease. On the other hand, the smaller the $\alpha$ value gets, the less candidate modes may be selected. Therefore, complexity of the encoding method according to the present disclosure may decrease and encoding performance may increase.

Method 3

Method 3 of the present disclosure proposes a new intra coding structure that uses a conventional intra prediction encoding method and a linear interpolation intra prediction encoding method. Particularly, Method 3 of the present disclosure proposes a method of determining an optimal intra prediction mode for a current block among intra prediction modes including a conventional intra prediction mode and an intra linear interpolation prediction mode. For example, Method 3 of the present disclosure may replace the method described with reference to FIG. 14. Alternatively, Method 3 of the present disclosure may replace the method described with reference to FIG. 15. In this case, an optimal intra prediction mode may be selected as a final intra prediction mode. And, the selected intra prediction mode may be used to obtain and encode a predictor of a current block.

Figure 21:
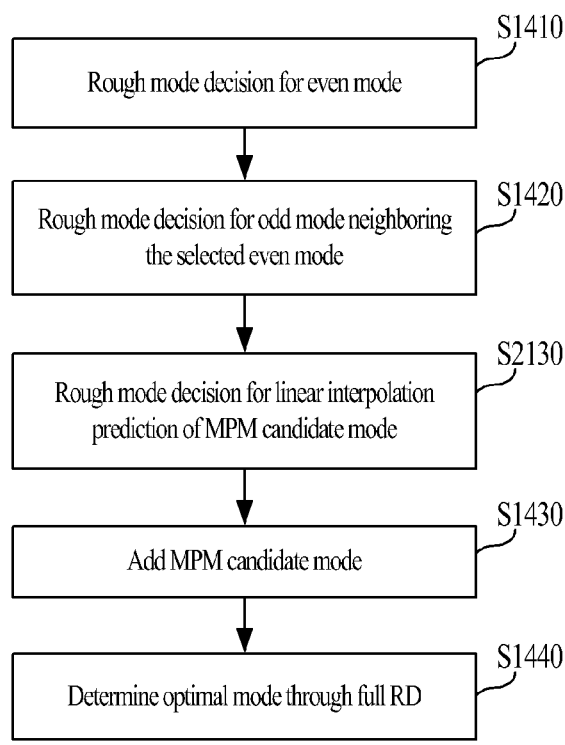
FIGS. 21 and 22 illustrate a flowchart of a method of determining an optimal intra prediction mode according to the present disclosure.

FIG. 21 exemplarily shows a method of determining an optimal mode in a new intra coding structure that uses a conventional intra prediction encoding method and a linear interpolation intra prediction encoding method.

The optimal mode determining method in the new intra prediction coding structure of FIG. 21 additionally includes a method (i.e., a step S2130) of a Rough Mode Decision (RMD) on linear interpolation prediction of an MPM candidate mode in comparison with the optimal mode determining method in the intra prediction coding structure of FIG. 14.

The optimal mode determining method in the new intra prediction coding structure determines a candidate even mode for full RD through rough mode decision on an even mode using the intra prediction encoding method like the method of FIG. 14 [S1410], and then re-determines a candidate mode for the full RD through rough mode decision using the intra prediction encoding method again for an odd mode resulting from adding ±1 to the determined even mode [S1420]. After the candidate mode for the full RD has been determined using the conventional intra prediction encoding method, a rough mode decision for a linear interpolation prediction encoding method is performed [S2130].

In the step S2130, the rough mode decision method for the linear interpolation prediction encoding method determines a candidate mode to use for a rough mode decision suing an MPM method. For example, as the MPM method, the method described with reference to FIG. 6, the method described with reference to FIG. 8, or the method described with reference to FIG. 23 may be used. After applying the rough mode decision method for the linear interpolation prediction to the MPM candidate mode selected by the MPM method, a candidate mode to use for the full RD is re-determined by comparing the mode already determined through the rough mode decision method for the intra prediction in the step S1410 and the step S1420 with a cost value.

An encoder adds an MPM candidate mode to the candidate modes determined in the step S2130, determines a candidate mode to use for the fill RD [S1430], and may then determine an optimal intra prediction mode by performing the full RD on the determined candidate mode [S1440].

The encoder may obtain a predictor for a current block based on the optimal intra prediction mode determined in the step S1440 and then encode the current block based on the obtained predictor.

Figures 22, 23:
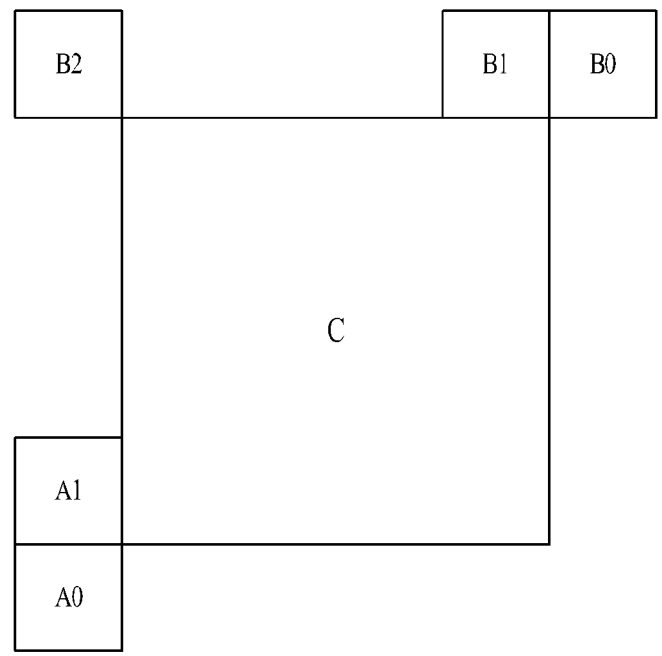
FIG. 23 illustrates a method of determining a candidate mode using an MPM method.

FIG. 22 shows an example of determining an optimal intra prediction mode using Method 3 of the present disclosure. In FIG. 22, N and M are positive integers and can be determined randomly. Particularly, values of N and M may be determined as 3 and 2, respectively, by which the present disclosure is non-limited, and they may be set to other values.

Referring to FIG. 22, Method 3 of the present disclosure may be divided into two processes (i.e., a Rough Mode Decision (RMD) step and a full RD process). The RMD process may include the steps S1410, S1420, S2130 and S1430, and the full RD process may include the step S1440.

First of all, N candidate modes are determined through an RMD method for an even mode [S1410]. Subsequently, N candidate modes updated through the RMD method for an odd mode resulting from adding ±1 to the determined N even candidate modes are determined [S1420]. In the N candidate modes updated in the step S1420, even modes and odd modes may coexist. Subsequently, N candidate modes, which are updated through the RMD method for 6 linear interpolation prediction candidate modes generated through the MPM generating process, are determined [S2130]. In the N candidate modes updated in the step S2130, a linear interpolation prediction mode may exist as a candidate mode together as well as a general intra prediction mode. M general modes generated through a final HEVC MPM generating process are added to candidate modes for the full RD [S1430]. Hence, the number of the candidate modes for the final full RD may become minimum N to maximum (N+M) modes. The number of the modes determined in the step S1430 is different, which is because a redundant mode checked through a redundant check process is not added. The full RD process is performed on the finally selected candidate mode from the perspective of rate-distortion optimization and an optimal intra prediction mode is determined [S1440].

An encoder generates a predictor for a current block by performing intra prediction encoding using the above-determined mode. If the selected optimal mode is a general intra prediction mode, a predictor is generated by performing the conventional intra prediction encoding. Otherwise, i.e., if the selected optimal mode is a linear interpolation intra prediction mode, a predictor is generated by performing the aforementioned linear interpolation intra prediction encoding (e.g., see FIGS. 11 to 13). If the selected optimal mode is a general intra prediction mode, LIP information may be configured to indicate that intra LIP is not applied to the current block. Otherwise, i.e., if the selected optimal mode is a linear interpolation intra prediction mode, LIP information may be configured to indicate that intra LIP is applied to the current block.

After generating a predictor for a current block using a method appropriate according to an optimal mode of the current block, a quantized transform coefficient information is generated by performing transform and quantization on residual information between an original pixel value of the current block and the generated predictor. Information (or LIP information) indicating a presence or non-presence of linear interpolation intra prediction encoding of the current block, mode information of a final current block, and quantized transform coefficient information are entropy-encoded and then transmitted to a decoder stage through a bitstream.

For example, mode information of the current block may include MPM flag information and/or MPM index information and/or intra prediction mode information. Syntax information and LIP information may be encoded into a bitstream in a manner corresponding to the method described with reference to FIG. 16, FIG. 17 or FIG. 19.

FIG. 23 exemplarily shows a method of determining a candidate mode using an MPM method according to the present disclosure.

Referring to FIG. 23, 'C' indicates a block (or a current block) to be encoded currently. A0, A1, B0, B1 and B2 indicate neighboring blocks of a current block C. An intra prediction mode of the neighboring blocks of the current block is selected while the neighboring blocks are searched in order of A1, B1, A0, B0 and B2. In doing so, a location of a neighboring block to search and the search order of the neighboring block may be determined randomly. Since there is no linear interpolation method for an intra planar prediction mode and an intra DC prediction mode in the linear interpolation intra prediction mode, if an intra prediction mode of a neighboring block is an intra planar prediction mode or an intra DC prediction mode, it is not included in candidate modes for the full RD.

After searching the candidate modes for the full RD while searching a neighboring block, if the number of candidate modes is smaller than a specific number (e.g., 6), a mode resulting from adding ±1 to each selected candidate mode is added again as a candidate mode. In doing so, if the number of the candidate modes becomes the specific number (e.g., 6), the MPM candidate mode determining method is ended. If the number of the candidate modes does not become the specific number (e.g., 6) despite adding all the modes resulting from adding ±1 to the selected candidate mode to the MPM candidate list, the basic mode defined in Equation 6 is sequentially included in the candidate modes while performing a redundancy check on the basic mode. In Equation 6, the order of a candidate of a basic mode and the basic mode may be determined randomly. As such an MPM candidate mode determining method goes through a redundant mode check process in all processes, a generated MPM candidate mode is generated as an only mode.

$$\text{Basic mode} = \{VER\_IDX, HOR\_IDX, 2, (VER\_IDX-1), VDIA\_IDX, DIA\_IDX\} \quad \text{[Equation 6]}$$

Among candidates of the basic mode, VER_IDX indicates an intra vertical prediction mode, HOR_IDX indicates an intra horizontal prediction mode, #2 mode indicates an intra bottom left diagonal prediction mode, VER_DIX−1 indicates an (intra vertical prediction mode −1) mode, VDIA_IDX indicates an intra top right diagonal prediction mode, and DIA_IDX indicates an intra top left diagonal prediction mode.

6 MPM candidate modes are usable for example in the MPM candidate mode generating method described with reference to FIG. 23, by which the present disclosure is non-limited. And, the present disclosure may generate MPM candidate modes in a manner of using random numbers such as 4, 5, 7 and the like as the number of the MPM candidate modes. As MPM index information performs encoding/decoding using a Truncated Unary (TU) code, if MPM candidate modes less than 6 that is the conventional number are used, there is an effect that encoding bits can be saved in performing encoding of a last MPM index. Therefore, if an occurrence frequency of a last MPM candidate is low, it is efficient that MPM index encoding bits are saved by decreasing the number of the MPM candidate modes. Thus, the number of the MPM candidate modes can be adjusted flexibly.

Method 4

Method 4 of the present disclosure proposes a method of applying linear interpolation intra prediction encoding variably depending on a size of a block. For example, Method 4 of the present disclosure may be used in the step S1505 of determining whether to apply linear interpolation intra prediction encoding in the method described with reference to FIG. 15 or FIG. 18.

Generally, linear interpolation intra prediction is efficient for a case that there is a complicated shape in a block. Hence, it is efficient not to use linear interpolation intra prediction for a block containing a simple region. Generally, in video encoding, in case of a block containing a complicated region, as the block is split, a size of the block gets smaller \gradually. On the other hand, in case of a block containing a simple region, the block is encoded/decoded into a block in large size instead of being split. For example, referring to FIG. 3 and FIG. 4, in case that a current CTU contains a complicated region, a current coding block is split into a higher depth or level and a size of the current coding block may decrease. On the other hand, if a current CTU contains a simple region, as the current coding block is not split or split into a lower depth or level, a size of the current coding block may increase.

Therefore, in Method 4 of the present disclosure, whether to apply linear interpolation intra prediction encoding is variably determined based on a size of a block to be currently encoded. In this case, the size of the block for determining whether to apply the linear interpolation intra prediction encoding may be determined by considering: 1) a width of the block to be currently encoded only; 2) a height of the block to be currently encoded only; 3) both of the width and the height; or 4) an area (=width×height) of the block.

One example of defining the size of the block to apply the linear interpolation intra prediction method is as follows. In this example, a reference length of the linear interpolation intra prediction application is defined as 16, by which the present disclosure is non-limited, and values other than 16 are usable. In addition, '16' defined in this example may be determined variably. Alternatively, at least one of the following 4 cases is selected to use for the present disclosure.

1) Case of determination by considering a width only: If width of block<specific value (e.g., 16), apply the linear interpolation intra prediction method.

2) Case of determination by considering a height only: If height of block<specific value (e.g., 16), apply the linear interpolation intra prediction method.

3) Case of determination by considering both of the width and the height: If width of block<specific value (e.g., 16) and height of block<specific value (e.g., 16), apply the linear interpolation intra prediction method.

4) Case of determination by considering an area of the block: If area of block<{specific value (e.g., 16)×specific value (e.g., 16)}, apply the linear interpolation intra prediction method.

If a current block corresponds to a case selected for Method 4 of the present disclosure from the above 4 cases, an intra prediction mode for the current block is determined based on the intra linear interpolation prediction method (e.g., see S1510 to S1530 of FIG. 15 or S1810 to S1820 of FIG. 18), a predictor of the current block is obtained based on the determined intra prediction mode, and the current block can be encoded.

If the current block fails to correspond to a case selected for Method 4 of the present disclosure from the above 4 cases, an intra prediction mode for the current block is determined based on the conventional intra prediction method instead of the intra linear interpolation prediction method (e.g., see S1540 to S1560 of FIG. 15 or FIG. 18), a predictor of the current block is obtained based on the determined intra prediction mode, and the current block can be encoded.

In case of applying Method 4 of the present disclosure, if the intra prediction mode of the current block is determined as an intra linear interpolation prediction mode, LIP information of the current block may be set to a value indicating that an intra LIP mode is applied for the current block. If the intra prediction mode of the current block is determined not as the intra linear interpolation prediction mode but as the conventional intra prediction mode, LIP information of the current block may be set to a value indicating that the intra LIP mode is not applied for the current block. Syntax information for intra prediction node signaling of the current block may include LIP information and/or MPM flag information and/or MPM index information and/or intra prediction mode information. Theses syntax informations are encoded into a bitstream in a manner corresponding to the method described with reference to FIG. 16, FIG. 17 or FIG. 19. A decoder may determine an intra prediction mode of the current block by obtaining the syntax informations from the bitstream by the method described with reference to FIG. 16, FIG. 17 or FIG. 19.

Method 5

Method 5 of the present disclosure proposes a method of applying linear interpolation intra prediction encoding variably depending on a prediction mode. Generally, in case of an intra vertical prediction mode, an intra horizontal prediction mode or an intra diagonal prediction mode except an intra planar prediction mode and an intra DC prediction mode, occurrence frequency is high in comparison to other general intra prediction modes. Hence, a method of applying a linear interpolation intra prediction mode to a specific mode having high occurrence frequency only is proposed.

The present disclosure proposes 1) a method of applying linear interpolation intra prediction to a specific mode having high occurrence frequency only in general, or 2) a method of applying linear interpolation intra prediction to modes including a mode neighboring a specific mode having high occurrence frequency.

Specific modes having high occurrence frequency may include, for example, an intra vertical prediction mode (e.g., #26 mode of FIG. 5 (INTRA_ANGULAR26) or #40 mode of FIG. 8 (INTRA_ANGULAR40)), an intra horizontal prediction mode (e.g., #10 mode of FIG. 5 (INTRA_ANGULAR10) or #18 mode of FIG. 8 (INTRA_ANGULAR18)), and an intra diagonal prediction mode (e.g., #2 mode (INTRA_ANGULAR2), #18 mode (INTRA_ANGULAR18) or #34 mode (INTRA_ANGULAR34) of FIG. 5 or #2 mode (INTRA_ANGULAR2), #36 mode (INTRA_ANGULAR36) or #66 mode (INTRA_ANGULAR66) of FIG. 8), by which the present disclosure is non-limited, and other random modes may be selected.

Figure 24:
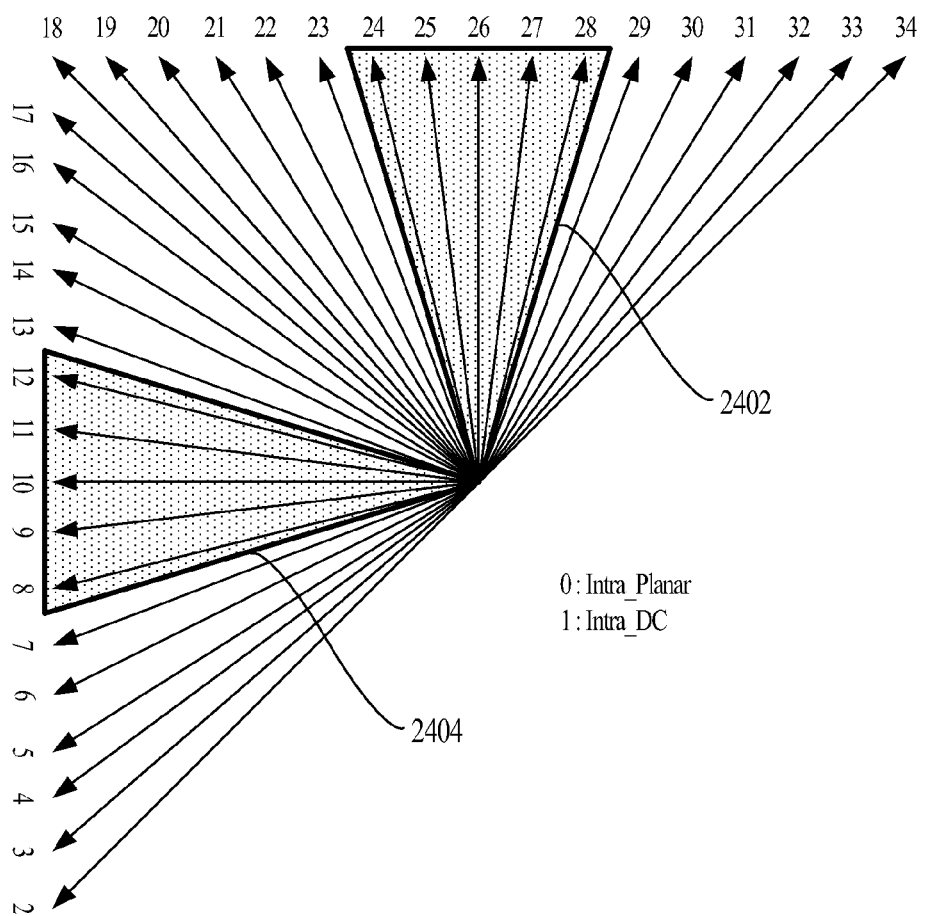
FIG. 24 illustrates a mode for applying an intra linear interpolation prediction mode according to the present disclosure.

FIG. 24 exemplarily shows a mode for applying an intra linear interpolation prediction mode according to Method 5 of the present disclosure. FIG. 24 shows a method of applying the above-mentioned method 2) of applying a linear interpolation intra prediction method including a mode neighboring a specific mode having high occurrence frequency. For clarity, the description is made based on the intra prediction mode of FIG. 5, by which the present disclosure is non-limited. And, the present disclosure is identically/similarly applicable to other intra prediction modes (e.g., see FIG. 8).

Referring to FIG. 24, a linear interpolation intra prediction mode is applied to a neighboring mode 2402 including an intra vertical prediction mode (#26 direction) and a neighboring mode 2404 including an intra horizontal prediction mode (#10 direction) only. In the example of FIG. 24, the linear interpolation intra prediction mode is applied to an intra vertical prediction mode and 4 neighboring modes (vertical mode +2 mode to vertical mode −2 mode) 2402 thereof in case of the intra vertical prediction mode and an intra horizontal prediction mode and 4 neighboring modes (horizontal mode +2 mode to horizontal mode −2 mode) 2404 thereof in case of the intra horizontal prediction mode.

Although specific modes are limited to a vertical mode and a horizontal mode in the example of FIG. 24, this is for example only, by which the present disclosure is non-limited. And, a random mode may be selected as a specific mode. Although an application range of a linear interpolation intra prediction mode is limited up to ±2 modes neighboring a specific mode, this is for example only, by which the present disclosure is non-limited. And, this may be determined variably as well.

Method 6

Method 6 of the present disclosure proposes a method of applying linear interpolation intra prediction encoding variably depending on a shape of a block. The present method applies linear interpolation intra prediction encoding variably in case of a block in a non-square shape.

Figure 25:
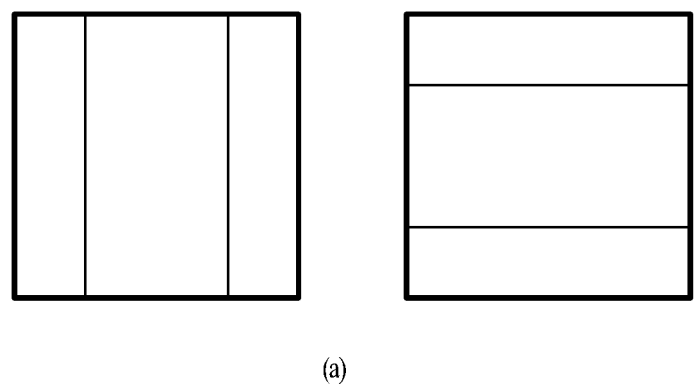
Figure 25:
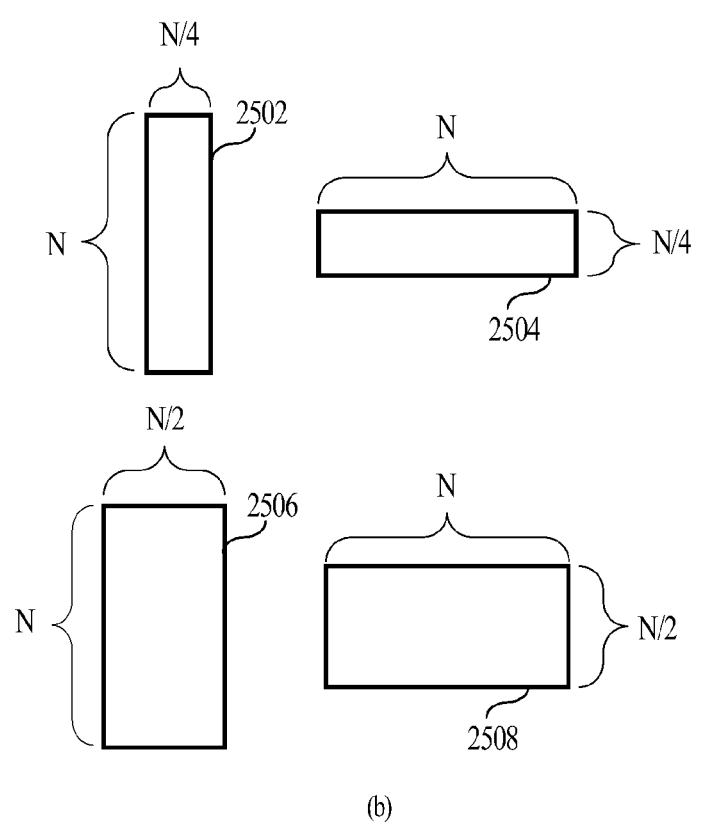

FIG. 25 exemplarily shows a non-square block to which the present disclosure is applicable.

In case of video decoding, encoding is performed using non-square blocks in various shapes to raise encoding efficiency. For example, as described with reference to FIG. 4, a coding block can be split in a binary tree manner. In this case, the split block may include a non-square block. For another example, as shown in FIG. 25 (a), a coding block may be split in a ternary manner. In this case, the split block may become a non-square block.

Referring to FIG. 25(b), non-square blocks split according to various split manners are exemplarily shown. Particularly, a non-square block to which the present disclosure is applied may have (N/4)×N size 2502, N×(N/4) size 2504, (N/2)×N size 2506, and N×(N/2) size 2508, by which the present disclosure is non-limited, and may have other sizes. The non-square block shown in FIG. 25(b) may be generated by being split from a coding tree block or a coding block, the split block may correspond to a current block and also correspond to a unit for performing intra prediction, transform, etc.

In FIG. 25(b), in case of (N/4)×N non-square block 2502 or (N/2)×N non-square block 2506, a width is short and a height is long. In case of such a non-square block, when an intra horizontal prediction mode for performing prediction using a left reference sample mainly is applied, as a distance between a prediction sample and a reference sample is short, prediction error is small. On the contrary, when an intra vertical prediction mode is applied for such a non-square block, as prediction is performed using a top reference sample, a distance between a reference sample and a prediction sample is long, whereby prediction error is big. Therefore, in case of the (N/4)×N non-square block 2502, a linear interpolation intra prediction mode is applied not for a mode having a horizontal directivity but for a mode having vertical directivity only.

If the same principle is applied to the N×(N/4) non-square block 2504 and the N×(N/2) non-square block 2508, with respect to a non-square block having a long width and a short height, a linear interpolation intra prediction mode is applied for a mode having horizontal directivity but is not applied for a mode having vertical directivity.

FIG. 26 shows a method of applying a linear interpolation intra prediction mode for a non-square block. For example, based on the intra prediction mode of FIG. 5, a horizontal directivity mode may include #2 mode (INTRA_ANGULAR2) to #18 mode (INTRA_ANGULAR18) and a vertical directivity mode may include #18 mode (INTRA_ANGULAR18) to #34 mode (INTRA_ANGULAR34). For another example, based on the intra prediction mode of FIG. 8, a vertical directivity mode may include #2 mode (INTRA_ANGULAR2) to #36 mode (INTRA_ANGULAR36) and a vertical directivity mode may include #36 mode (INTRA_ANGULAR36) to #66 mode (INTRA_ANGULAR66).

Figure 27:
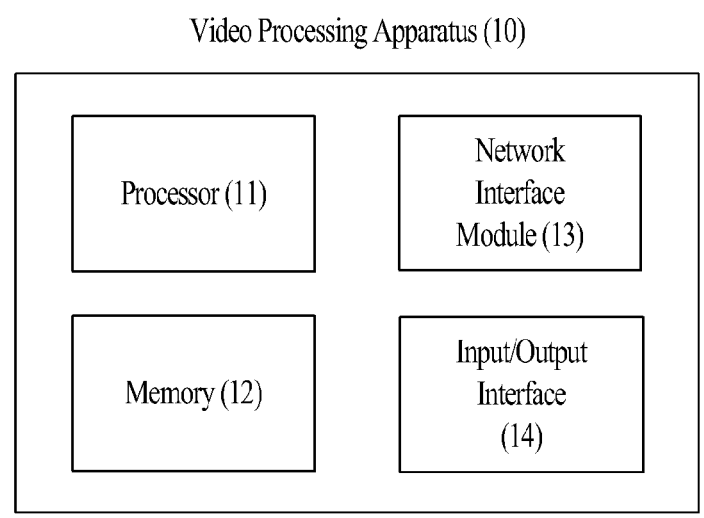
FIG. 27 illustrates a video processing apparatus to which the present disclosure can be applied.

FIG. 27 illustrates a block diagram to which the present invention can be applied. The video processing apparatus may include an encoding apparatus and/or a decoding apparatus of a video signal. For example, the video processing apparatus to which the present invention can be applied may include a mobile terminal such as a smart phone, a mobile equipment such as a laptop computer, a consumer electronics such as a digital TV, a digital video player, and etc.

A memory 12 may store program for processing and controlling by a processor 11, and may store a coded bitstream, a reconstructed image, control information, and the like. Further, the memory 12 may be used as a buffer for various video signals. The memory 12 may be implemented as a storage device such as a ROM (Read Only Memory), RAM (Random Access Memory), EPROM (Erasable Programmable Read Only Memory), EEPROM (Electrically Erasable Programmable Read-Only Memory), a flash memory, SRAM (Static RAM), HDD (Hard Disk Drive), SSD (Solid State Drive), and etc.

The processor 11 controls operations of each module in the video processing apparatus. The processor 11 may perform various control functions to perform encoding/decoding according to the present invention. The processor 11 may be referred to as a controller, a microcontroller, a microprocessor, a microcomputer, or etc. The processor 11 may be implemented as a hardware or a firmware, a software, or a combination thereof. When the present invention is implemented using a hardware, the processor 11 may comprise ASIC (application specific integrated circuit), DSP (digital signal processor), DSPD (digital signal processing device), PLD (programmable logic device), FPGA (field programmable gate array), or the like. Meanwhile, when the present invention is implemented using a firmware or a software, the firmware or software may comprise modules, procedures, or functions that perform functions or operations according to the present invention. The firmware or software configured to perform the present invention may be implemented in the processor 11 or may be stored in the memory 12 and executed by the processor 11.

In addition, the apparatus 10 may optionally include a network interface module (NIM) 13. The network interface module 13 may be operatively connected with the processor 11, and the processor 11 may control the network interface module 13 to transmit or receive wireless/wired signals carrying information, data, a signal, and/or a message through a wireless/wired network. For example, the network interface module 13 may support various communication standards such as IEEE 802 series, 3GPP LTE(-A), Wi-Fi, ATSC (Advanced Television System Committee), DVB (Digital Video Broadcasting), and etc., and may transmit and receive a video signal such as a coded bitstream and/or control information according to the corresponding communication standard. The network interface module 13 may not be included as necessary.

In addition, the apparatus 10 may optionally include an input/output interface 14. The input/output interface 14 may be operatively connected with the processor 11, and the processor 11 may control the input/output interface 14 to input or output a control signal and/or a data signal. For example, the input/output interface 14 may support specifications such as USB (Universal Serial Bus), Bluetooth, NFC (Near Field Communication), serial/parallel interface, DVI (Digital Visual Interface), HDMI (High Definition Multimedia Interface) so as to be connected with input devices such as a keyboard, a mouse, a touchpad, a camera and output devices such as a display.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be implemented by various means, for example, hardware, firmware, software, or a combination thereof. In a hardware implementation, an embodiment of the present invention may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention can be applied to a video processing apparatus such as a decoding apparatus or an encoding apparatus.

What is claimed is:

1. A method of decoding a bitstream for a video signal by a decoding apparatus, the method comprising:
    obtaining a first flag information from the bitstream, the first flag information indicating whether an intra linear interpolation prediction is performed for a current block;
    skipping parsing of a second flag information indicating whether an intra prediction mode of the current block is derived from a neighboring block of the current block and obtaining a first index information from the bitstream based on the first flag information indicating that the intra linear interpolation prediction is performed for the current block, or
    parsing the second flag information based on the first flag information indicating that the intra linear interpolation prediction is not performed for the current block;
    constructing a candidate mode list based on an intra prediction mode of the neighboring block of the current block;
    determining a candidate mode indicated by the first index information in the candidate mode list as the intra prediction mode of the current block; and
    generating a predictor for the current block by performing an intra LIP based on the determined intra prediction mode.

2. The method of claim 1, wherein performing the LIP comprises:
    generating a bottom right reference sample for the current block;
    generating bottom reference samples for the current block, wherein the bottom reference samples include a reference sample generated by performing a first linear interpolation based on a bottom left reference sample adjacent to a bottom left of the current block and the bottom right reference sample, the bottom left reference sample, and reference samples generated by copying left reference samples adjacent to a left of the current block onto same vertical coordinates as the bottom reference samples respectively; and
    generating a prediction sample by performing a second linear interpolation based on the determined intra prediction mode, the bottom reference samples, and top reference samples adjacent to a top of the current block.

3. The method of claim 2, wherein the bottom right reference sample is generated based on a top right reference sample adjacent to a top right of the current block and the bottom left reference sample.

4. The method of claim 2, wherein the bottom right reference sample is generated based on a bottom right corner reference sample within a top right neighboring block adjacent to a top right of the current block and having a same size as the current block and a bottom right corner reference sample within a bottom left neighboring block adjacent to a bottom left of the current block and having the same size as the current block.

5. The method of claim 2, wherein a weight for the second linear interpolation is determined based on a difference of a vertical coordinate between a sample of the current block and the top reference samples and a difference of a vertical coordinate between the sample of the current block and the bottom reference samples.

6. The method of claim 1, further comprising:
when the intra linear interpolation prediction is not performed for the current block according to the first flag information, obtaining the second flag information from the bitstream;
when the intra prediction mode of the current block is derived from the neighboring block according to the second flag information, obtaining a second index information from the bitstream and determining a candidate mode indicated by the second index information among the candidate mode list as the intra prediction mode of the current block; and
when the intra prediction mode of the current block is not derived from the neighboring block according to the second flag information, obtaining an intra prediction mode information from the bitstream and obtaining the intra prediction mode of the current block based on the intra prediction mode information.

7. The method of claim 1, wherein the candidate mode list is constructed to include 3 candidate modes including at least one of an intra prediction mode of a left neighboring block adjacent to the current block or an intra prediction mode of a top neighboring block adjacent to the current block.

8. The method of claim 1, wherein the candidate mode list is constructed to include 6 candidate modes including at least one of an intra prediction mode of a left neighboring block adjacent to the current block, an intra prediction mode of a bottom left neighboring block adjacent to the current block, an intra prediction mode of a top neighboring block adjacent to the current block, an intra prediction mode of a top left neighboring block adjacent to the current block, or an intra prediction mode of a top right neighboring block adjacent to the current block.

9. The method of claim 1, wherein the candidate mode list includes an intra angular prediction mode other than an intra planar prediction mode and an intra DC prediction mode.

10. An apparatus for decoding a bitstream for a video signal, the apparatus comprising:
a memory; and
a processor connected to the memory,
wherein the processor is configured to:
obtain a first flag information from the bitstream, the first flag information indicating whether an intra linear interpolation prediction is performed for a current block;
skip parsing of a second flag information indicating whether an intra prediction mode of the current block is derived from a neighboring block of the current block and obtain a first index information from the bitstream based on the first flag information indicating that the intra linear interpolation prediction is performed for the current block, or
parsing the second flag information based on the first flag information indicating that the intra linear interpolation prediction is not performed for the current block;
construct a candidate mode list based on an intra prediction mode of the neighboring block of the current block;
determine a candidate mode indicated by the first index information in the candidate mode list as the intra prediction mode of the current block; and
generate a predictor for the current block by performing an intra LIP based on the determined intra prediction mode.

* * * * *